US008024287B2

(12) United States Patent
Abouzied et al.

(10) Patent No.: US 8,024,287 B2
(45) Date of Patent: Sep. 20, 2011

(54) APPARATUS AND METHOD FOR DYNAMICALLY MATERIALIZING A MULTI-DIMENSIONAL DATA STREAM CUBE

(75) Inventors: Azza Mohamed Nagib Mohamed Shawkat Abdellatif Abouzied, Halifax (CA); Jacob Slonim, Bedford (CA); Michael Joseph McAllister, Halifax (CA)

(73) Assignee: SAP France S.A., Paris (FR)

( * ) Notice: Subject to any disclaimer, the term of this patent is extended or adjusted under 35 U.S.C. 154(b) by 560 days.

(21) Appl. No.: 12/163,952

(22) Filed: Jun. 27, 2008

(65) Prior Publication Data
US 2009/0327330 A1    Dec. 31, 2009

(51) Int. Cl.
*G06F 7/26* (2006.01)
*G06F 17/30* (2006.01)
(52) U.S. Cl. .................................. 707/603; 707/958
(58) Field of Classification Search .................. 707/102, 707/999.102, 600, 603, 958, 104.1, 999.107
See application file for complete search history.

(56) References Cited

U.S. PATENT DOCUMENTS
7,467,127 B1 * 12/2008 Baccash et al. ........................ 1/1
2009/0006148 A1 * 1/2009 Bacalski et al. .................. 705/7

OTHER PUBLICATIONS

D. J. Abadi, et al., "The Design of the Borealis Stream Processing Engine," 2nd Biennial Conference on Innovative Data Systems Research, Asilomar, CA, Jan. 2005.
D. J. Abadi, et al., "Aurora: A New Model and Architecture for Data Stream Management," The Very Large Data Bases (VLDB) Journal, 12(2):120-139, 2003.
A. Arasu, et al., "STREAM: The Stanford Data Stream Management System," downloaded from http://infolab.stanford.edu/stream, (also click on the link and print the page), 2004.
A. Arasu, et al., "The CQL Continuous Query Language: Semantic Foundations and Query Execution," downloaded from http://infolab.stanford.edu/stream, 2005.
Y. D. Cai, et al., "Maids: Mining Alarming Incidents from Data Streams," Proceedings of the 2004 ACM SIGMOD International Conference on Management of Data, p. 919-920, New York, NY, 2004.
S. Chandrasekaran, et al., "TelegraphCQ: Continuous Dataflow Processing for an Uncertain World," Proceedings of the 2003 CIDR Conference, Jan. 2003.
J. Han, et al., "Stream Cube: An Architecture for Multi-Dimensional Analysis of Data Streams," Distributed and Parallel Databases: Special Issue on Data Warehousing and Data Streams, Springer-Verlag, Sep. 2005.
S. Madden, et al., "Continuously Adaptive Continuous Queries Over Streams," Proceedings of the 2002 ACM SIGMOD International Conference on Management of Data, p. 49-60, New York, NY, 2002.
M. Stonebraker, et al., "The 8 Requirements of Real-Time Stream Processing," 21st International Conference on Data Engineering, Tokyo, Japan, Apr. 2005.

* cited by examiner

*Primary Examiner* — James Trujillo
*Assistant Examiner* — Bruce M Moser
(74) *Attorney, Agent, or Firm* — Mintz, Levin, Cohn, Ferris, Glovsky and Popeo, P.C.

(57) ABSTRACT

A computer readable storage medium comprises executable instructions to generate a stream cube to store data received from multiple data sources. A plurality of multi-dimensional data streams are generated to represent the received data. A materialization strategy is repeatedly determined for the stream cube. The stream cube is materialized according to the materialization strategy to record the multi-dimensional data streams.

24 Claims, 17 Drawing Sheets

APPARATUS AND METHOD FOR DYNAMICALLY MATERIALIZING A MULTI-DIMENSIONAL DATA STREAM CUBE

CROSS-REFERENCE TO RELATED APPLICATIONS

This application is related to the commonly owned patent application entitled "Apparatus and Method for Facilitating Continuous Querying of Multi-Dimensional Data Streams", filed the same day as the present application, application Ser. No. 12/163,972, the contents of which are hereby incorporated by reference.

FIELD OF THE INVENTION

This invention relates generally to the management and monitoring of multi-dimensional data streams in a stream cube. More particularly, this invention relates to techniques for dynamically materializing a stream cube to ensure just-in-time responses.

BACKGROUND OF THE INVENTION

Business Intelligence ("BI") generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, such as relational, Online Transaction Processing ("OLTP") and Online Analytic Processing ("OLAP") databases, and performance management applications to provide business metrics, dashboards, and scorecards, as well as best-practice analysis techniques for gaining business insights.

Traditional BI tools have supported long-term decision planning by transforming transactional data into summaries about the organization's operations over a period of time. While this information is valuable to decision makers, it remains an after-the-fact analysis with latencies from data arrival to report production. The information needs of operational decision-making cannot be addressed entirely by traditional BI technologies. Effective operational decision-making requires little delay between the occurrence of a business event and its detection or reporting. Just-in-time, finer grained information is necessary to enable decision makers to detect opportunities or problems as they occur. BI technologies are not designed to provide just-in-time analysis.

Business Activity Monitoring ("BAM") is the set of technologies that fills in this gap. BAM technologies provide right-time or just-in-time reporting, analysis, and alerting of significant business events, accomplished by gathering data from multiple applications. Right-time differs from real-time analysis. In right-time analysis, the main goal is to signal opportunities or problems within a time frame in which decision making has a significant value. Real-time analysis requires that opportunities or problems be signaled in a pre-specified, very short time-frame, even if the alert has the same decision-making value a day after the occurrence of the events that triggered it. Real-time operation, although preferred, is not essential. The goal is to analyze and signal opportunities or problems as early as possible to allow decision making to occur while the data is fresh and of significance. BAM therefore encourages proactive decision making.

Business events, transactional data or messages are modeled in BAM as "data streams". A data stream is a sequence of time-stamped data items or tuples that have a fixed schema or structure and arrive in a given time order. A data stream S can be expressed as a sequence of pairs $(s,\tau)$, where s is a tuple belonging to the fixed schema of S and $\tau$ is a timestamp associated with the tuple. Timestamps could be explicit, i.e., assigned by data sources, requiring all data sources and query processing systems to be time synchronized, or they could be implicit, i.e., assigned on entry and representing tuple arrival time rather than tuple production time.

The data schema defines fields and a data type for each field. The tuples within a data stream consist of values for these fields. For example, a data stream schema representing sales data may, include, for example, fields such as productID, product status, price, quantity, store_sales, storeID, city, store type, customerID, and employeeId, among others. A data stream schema representing an employee could include fields such as employeeID, first_name and last_name. For example, an employee data stream with the schema $S_e$=(employeeID, first_name, and last_name) may have a tuple $s_e$= (1345, "Willy", "Loman") and a sales data stream with schema $S_s$=(employeeID, store_ID, total_sales) may have a tuple $s_s$=("Willy Loman", 123, 10$).

The nature of queries and data analysis necessary for processing these types of time-stamped data streams is usually domain specific. For example, if a BAM system is used for monitoring stocks, a significant amount of user queries may focus on detecting threshold conditions. Queries may ask if the price of a particular stock increased or decreased above or below a given threshold. If a BAM system is used to provide just-in-time analysis of sales data, a significant amount of the queries may focus on multi-dimensional analysis or on the aggregation of the sales data across a variety of fields, such as customer profile, region, product type, and so on.

Such multi-dimensional analysis may be performed with a specialized multi-dimensional data architecture, generally referred to as the "stream cube". A stream cube consists of a number of cuboids, with each cuboid representing multi-dimensional data with unique values for measures of a set of dimensions and different abstraction levels. Dimensions are a type of data model object that represent a side of a multi-dimensional data structure. Examples of dimensions include region, store, year, customer, employee, and product line, among others. Dimensions are defined by hierarchies of abstraction levels. The region dimension, for example, may have the following abstraction levels: city, country, continent, all.

Measures are quantities as ascertained by comparison with a standard, usually denoted in units such as units sold, dollars, etc. Measures are typically used to evaluate a quantifiable component of an organization's performance. For example, measures may include return on investment, revenue, sales volume, unit sales, store sales, inventory levels, cycle times, supply chain costs, number of customers, and the like. These measures summarize the data at the varying levels of abstraction. For example, the measure sales may be aggregated over a particular store, or over all stores in a state, country, etc.

A complete d-dimensional stream cube contains $a^d$ cuboids, where a is the number of abstraction levels for each dimension. For example, a 3-D stream cube may have three dimensions and an aggregate measure. If each dimension has only two levels of abstraction, then the cube has $2^3$ or eight possible cuboids. An example of a 3-D stream cube is illustrated in FIG. 1. Stream cube 100 has eight cuboids 105-140 representing different levels of abstraction for the dimensions A, B, and C with the aggregate measure M. Measure M could be any aggregate measure such as, for example, sum or count.

Cuboid 105 is generally referred to as the "base cuboid", as it represents the least abstract data representation or generalization. Base cuboid 105 consists of every possible combination of data values for the lowest abstraction level of each dimension with the aggregate measure M calculated for each combination. Conversely, cuboid 140 is Generally referred to as the "apex cuboid," as it represents the most abstract data representation or generalization. Apex cuboid 140 consists of one aggregate measure calculated over all the data. The other cuboids 110-135 in between base cuboid 105 and apex cuboid 140 contain measures calculated over different combinations of abstraction levels for each dimension. For example, cuboid 125 contains the measure M over the different values of dimension A, with dimensions B and C abstracted to their more general form.

Physically, each cuboid in a stream cube consists of a table that stores the respective combinations of dimensions and measures. The stream cube links up all the cuboids in a hierarchical structure. For example, suppose in stream cube 100 dimension A is a geographical dimension (e.g., country, state, city, etc.), dimension B is a product dimension (e.g., product category, product sub-category, etc.), dimension C is a store dimension (e.g., store type, etc.), and measure M is a sales measure. Base cuboid 105 consists of a table showing the sales value for all possible combinations of the geographical dimension A, product dimension B, and store dimension C. Apex cuboid 140 consists of a single value representing the total sales across the geographical, product, and store dimensions. And cuboid 125 shows the sales value for all possible combinations of the geographical dimension A.

Depending on the size of the stream cube, maintaining or materializing all cuboids within the cube is neither cost-effective nor practical. Data streams may contain detailed data such that analyzing the data at the stream level does not facilitate the discovery of useful trends or patterns in the data. Aggregating the data to a higher abstraction level is often necessary.

The stream cube may be fully materialized, with aggregate measures calculated for each cuboid, or partially materialized, with aggregate measures calculated for only a subset of cuboids. In this latter case, to find the measure of an immaterialized cuboid, the measures of cuboids at lower abstraction levels are aggregated to the immaterialized cuboid at the higher abstraction level.

A stream cube is said to be a relatively stable in size data cube. A stable stream cube may be designed by using a windowing model and setting bounds on the lowest and highest abstraction levels. A windowing model defines a time window in which all data tuples are important and processed if falling within the window and discarded or ignored otherwise. An example of such a windowing model is commonly referred to as the "tilted time frame". The tilted time frame registers measures of most recent data at a finer granularity compared to measures of data that arrived at a more distant time.

In doing so, the tilted time frame compresses the data by gradually fading out old data. The level of granularity at which recent and past data is registered is dependent on the application domain. By integrating the tilted time frame into the stream cube, the size of the cube could be stabilized so long as the other dimensions in the cube are relatively stable with time.

An example of a tilted time frame is illustrated in FIG. 2. In tilted time frame 200, measures of data received a week ago are stored at a granularity of one day whereas measures of data received within the last fifteen minutes are stored at one minute granularity. For example, sales made a week ago would be counted per day, whereas sales made in the last fifteen minutes would be counted per minute. Tilted time frame 200 is divided into legs or sections, with each leg representing a group of time ranges. Each leg or section of tilted time frame 200 contains sub-cubes. A sub-cube is a stream cube that aggregates data only for a given time range. For example, the 1-hour leg 205 of tilted time frame 200 consists of four fifteen-minute sub-cubes that maintain measures for the following time intervals; (t−30 min, t−15 min], (t−45 min, t−30 min], (t−60 min, t−45 min], and (t−75 min, t−60 min], Here t represents the current time and "(x,y]" is an interval set notation meaning "between x but not including x, and up-to and including y".

To keep the stream cube stable, each sub-cube is partially materialized along a subset of abstraction levels. Previous work has suggested materializing a stream cube along at least two abstraction levels, generally referred to as the "minimally-interesting layer" ("m-layer") and the "observation layer" ("o-layer"). The m-layer represents the minimally interesting layer at which examining the data is productive. It is necessary to have such a materialized layer since it is often neither cost-effective nor practically interesting to examine the minute detail of stream data. Any cuboid below the m-layer is not materialized or computed. The o-layer represents the cuboid that is observed by most users, that is, the layer that a user takes as an observation deck, watching the changes of the current stream data by examining the slopes of changes at this layer to make decisions.

An example of a stream cube with the materialized m- and o-layers is illustrated in FIG. 3. Stream cube 300 is a 3-D data cube with dimensions region, product, and store type. The region dimension has three abstraction levels {city, country, all}, the product dimension has three abstraction levels {sub_category, category, all}, and the store type dimension has two abstraction levels {store_type, all}. Stream cube 300 has an m-layer 305 that groups measures by product sub-category and city as it aggregates the dimension store type to its highest abstraction level (i.e., all). M-layer 305 is computed by moving from cuboid 315 of (store_type, city, sub_category) to m-layer 305 by grouping or aggregating measures for different store_types.

Stream cube 300 also has an o-layer 310 that aggregates all dimensions. O-layer 310 corresponds to the apex cuboid of stream cube 300. The m- and o-layers 305-310 are always materialized and computed. All cuboids between those layers are reachable or could be computed on demand. All cuboids outside those layers, such as cuboid (store_type, city, category) 320, cannot be computed on demand.

There are three materialization options for the remaining, intermediate cuboids: (1) on-demand materialization, in which case the intermediate cuboids can be computed on demand if desired; (2) full materialization, in which case all cuboids in the stream cube are updated upon arrival of data streams; or (3) partial materialization, in which case only a subset of the intermediate cuboids are computed along a "materialization path" between the m-layer and the o-layer. A materialization path is a sequence of cuboids $C_1 \ldots C_n$ that connect the r-layer $C_1$ to the o-layer $C_n$ such that each cuboid $C_i$ could be incrementally updated by aggregating measures in the previous cuboid $C_{i-1}$.

Previous work has suggested that the latter alternative—that of partial materialization—is best suitable for the analysis of multi-dimensional data streams. In this case, the stream cube may be partially materialized along a materialization path that is static and computed by an expert. This materialization path, referred to as the "popular materialization path" or as the "popular drilling path", contains the cuboids that users are most likely to request when drilling down from the o-layer to the m-layer.

The expert typically chooses this path based on his/her knowledge of the most likely requested data groupings in a particular application domain. For example, if users are more interested in examining sales by city and category compared to sales by country and sub_category, then the cuboid (city, category) is part of the popular materialization path. A popular materialization path is illustrated in stream cube 300 between m-layer 305 and o-layer 310. Intermediate cuboids 325-355 between m-layer 305 and o-layer 310 are the only cuboids that are materialized or computed in stream cube 300 between m-layer 305 and o-layer 310.

Although the popular path provides a way to partially materialize a stream cube so the size of the cube is stabilized, its static nature prevents the stream cube to fully respond to changes in users' just-in-time requests, changes in users' access to the stream cube (e.g., not all users may be able to have access to the same portions of the stream cube), as well as changes in system conditions (e.g., memory, storage space, etc,) over the duration of the stream cube. For example, several factors may influence the users' requests over time, including competition-induced factors, seasonal factors, market or economic factors, and external or unexpected factors. Other factors could influence users' requests such as internal business decisions or new governmental policies or regulations. These factors could be responsible for dimensional shifts in users' requests as well as shifts towards the observation and analysis of certain measures.

The popular path also prevents users from observing different cuboids according to their business. From a BAM perspective, users at different management levels deal with data at different abstraction levels. It is therefore unlikely that all users prefer to analyze the data only along the popular path between the m- and o-layers and drill down occasionally. Instead, users' requests are more typically scattered across the cube at different abstraction levels. For example, a regional sales manager might be interested in sales across particular stores, while a product manager might be interested in the sales of particular products. This difference in perspective makes the choice of a static materialization path detrimental to the efficiency of a stream cube within a BAM system. A static materialization path that is fixed for the duration of the stream cube does not satisfy the evolution and changes in just-in-time users' requests.

Accordingly, it would be desirable to provide techniques for partially materializing a stream cube to account for changes in users' requests and changes in system conditions. In particular, it would be highly desirable to provide techniques to dynamically materialize the stream cube to ensure just-in-time responses.

SUMMARY OF THE INVENTION

The invention includes a computer readable storage medium with executable instructions to generate a stream cube to store data received from multiple data sources. A plurality of multi-dimensional data streams are generated to represent the received data. A materialization strategy is repeatedly determined for the stream cube. The stream cube is materialized according to the materialization strategy to record the multidimensional data streams.

The invention also includes a computer readable storage medium with executable instructions to generate a stream cube for representing multi-dimensional data streams. A materialization path is repeatedly determined for the stream cube based on a predetermined criterion and a cost function. The multi-dimensional data streams are recorded into the stream cube according to the materialization path.

The invention further includes a method for dynamically materializing a multi-dimensional stream cube having a plurality of cuboids. A cost for materializing each cuboid is computed. A cost for each potential materialization path in the stream cube is computed. A materialization path is selected from the potential materialization paths in the stream cube that has the lowest cost.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

The present invention provides a systems, method, software arrangement, and computer readable storage medium for dynamically materializing a multi-dimensional data stream cube. A multi-dimensional data stream cube, as generally used herein, refers to a multi-dimensional data architecture for managing and monitoring multi-dimensional data streams. A multi-dimensional data stream, as generally used herein, refers to a sequence of time-stamped data items or tuples that have a fixed schema or structure and arrive in some order. A data stream S can be expressed as a sequence of pairs (s,τ), where s is a tuple belonging to the fixed schema of S and τ is a timestamp associated with the tuple.

Figure 1:
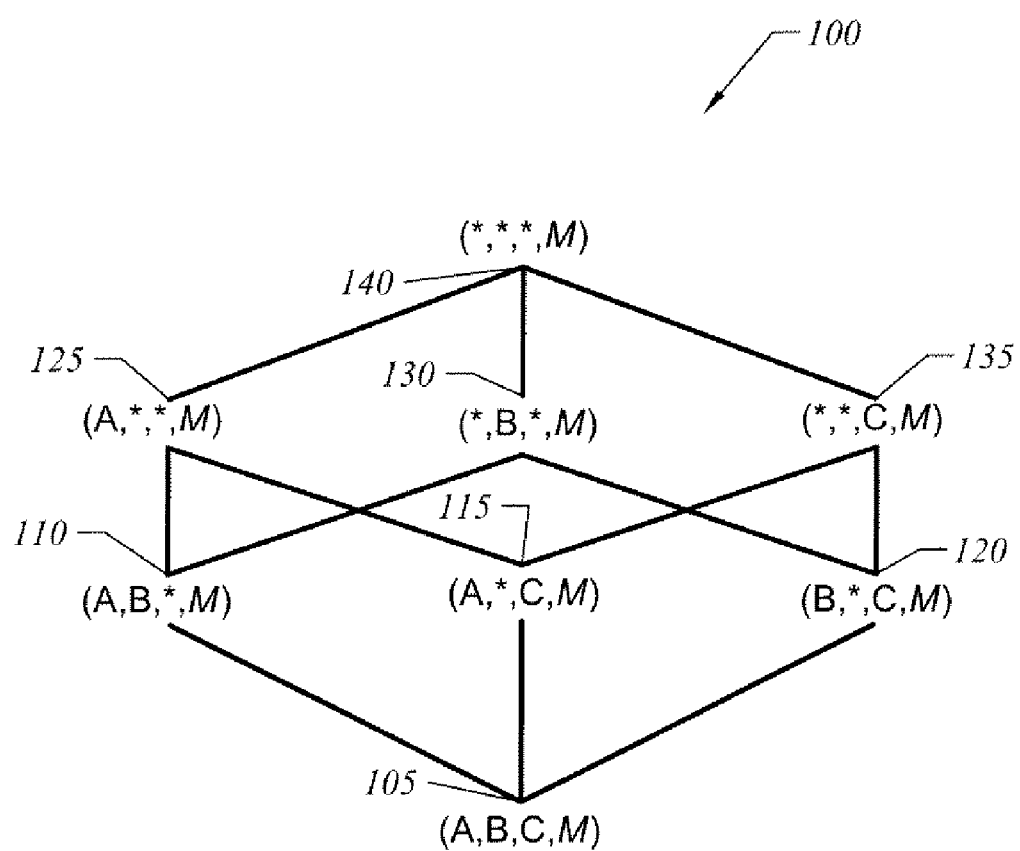
FIG. 1 illustrates an exemplary prior art 3-D stream cube.
Figure 2:
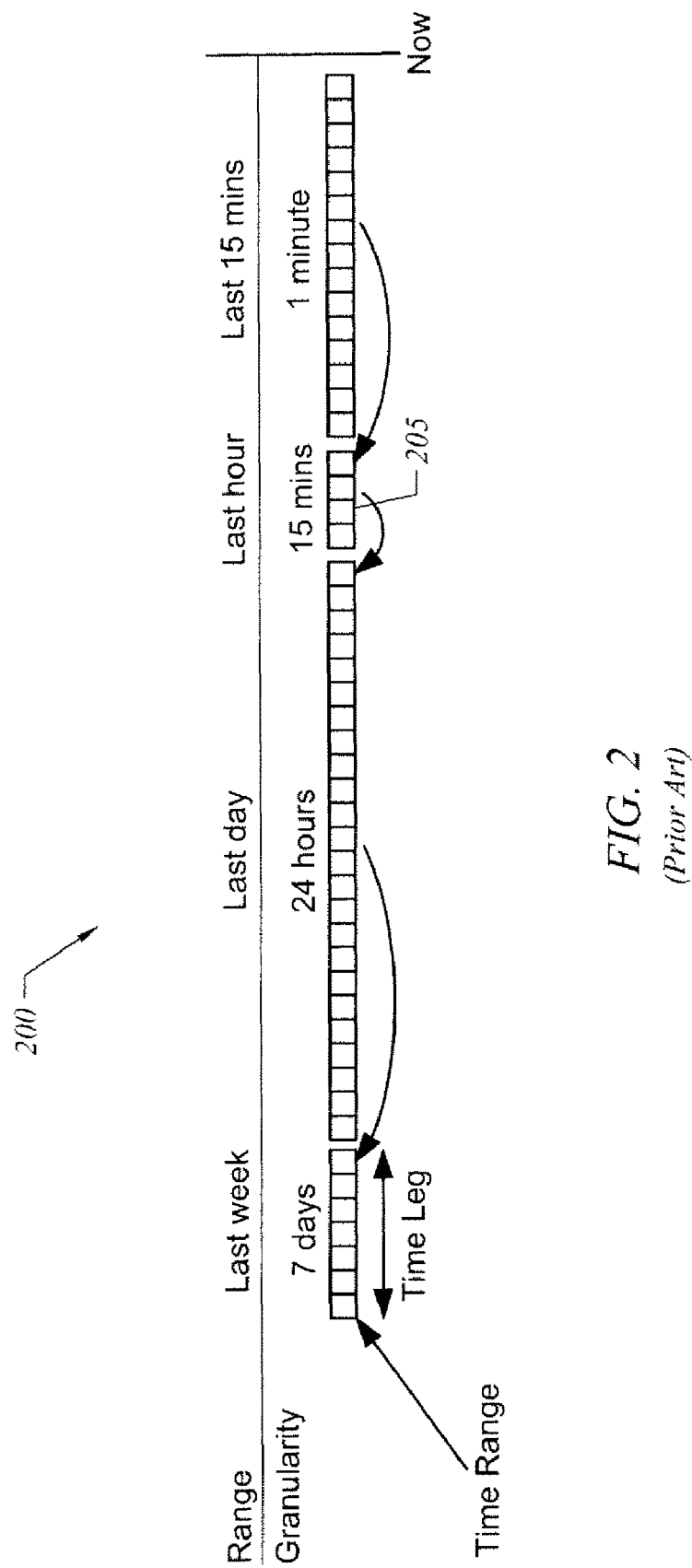
FIG. 2 illustrates a prior art tilted time frame.
Figure 3:
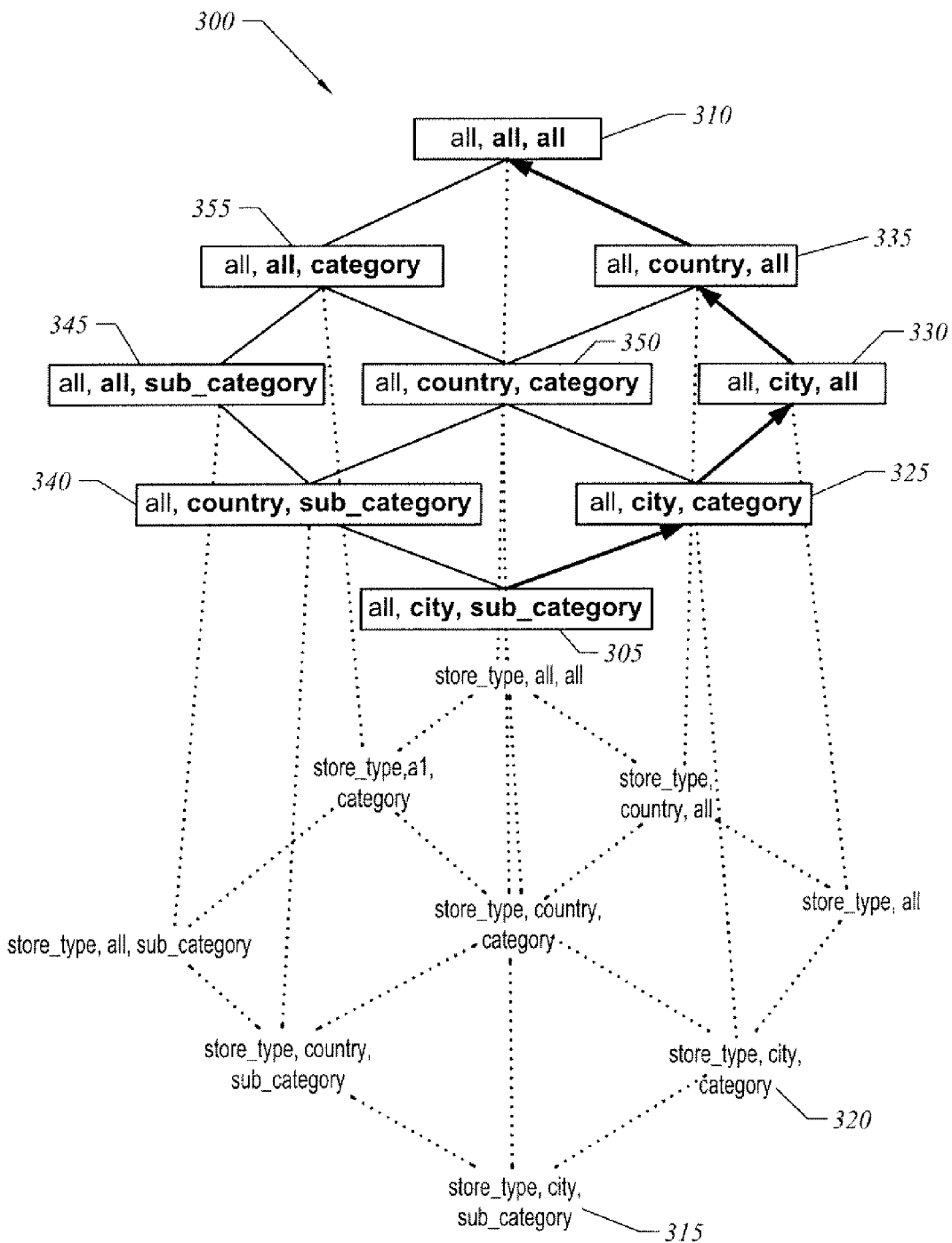
FIG. 3 illustrates a prior art 3-D stream cube with materialized m- and o-layers and having a popular materialization path.

According to an embodiment of the invention, the multi-dimensional data stream cube consists of a plurality of sub-cubes associated with a plurality of time ranges in a tilted time frame, described above with reference to FIG. 2. Each sub-cube consists of a number of cuboids, with each cuboid aggregating multi-dimensional data at a given level of granularity and at a given time range. For example, a base cuboid within a given sub-cube aggregates measures for every possible combination of dimensions for its associated time range. Another cuboid within the given sub-cube, commonly referred to as the apex cuboid, aggregates measures over all dimensions for its associated time range. In one embodiment, sub-cubes are grouped by legs or sections of time within the tilted time frame. A leg of time in a tilted time frame, as generally used herein, represents a group of time ranges, with each time range associated with a given sub-cube.

In one embodiment, each sub-cube is partially materialized along a first layer and a second layer. The first layer may be, for example, a minimally interesting layer ("m-layer") and the second layer may be, for example, an observation layer ("o-layer"). The m-layer, as generally used herein, represents the layer at the lowest abstraction level in which cuboids are materialized. Any cuboid below the m-layer is not materialized or computed. Conversely, the o-layer, as generally used herein, represents a materialized cuboid at the highest abstraction layer (i.e., the cuboid observed by most users) within a given sub-cube, In one embodiment, the o-layer corresponds to the apex cuboid and contains a single value for all measures observed for any given sub-cube. As appreciated by one of ordinary skill in the art, the o-layer may be any cuboid above the m-layer.

According to an embodiment of the invention, each sub-cube is dynamically materialized. Depending on system conditions, such as, for example, data rates, memory availability, and storage space, requested cuboids may be materialized as requested. Alternatively, cuboids within a sub-cube may be materialized only along a dynamic materialization path. The dynamic materialization path, as generally used herein, represents a materialization path between the m-layer and the o-layer within each sub-cube along which cuboids are materialized. A materialization path, as generally used herein, is then a sequence of cuboids $C_1 \ldots C_n$ that connect the m-layer $C_1$ to the o-layer $C_n$ such that each cuboid $C_i$ could be incrementally updated by aggregating measures in the previous cuboid $C_{i-1}$.

In one embodiment, the dynamic materialization path is repeatedly computed according to a predetermined criterion and based on a cost function. The predetermined criterion, described in more detail herein below, determines when to compute the dynamic materialization path, such as, for example, at every user query, at given time intervals, or depending on the change in users' requests. The cost function, also described in more detail herein below, determines the factors used to determine the dynamic materialization path. Those factors take into account the dynamic nature of users' requests and system conditions.

Figure 4:
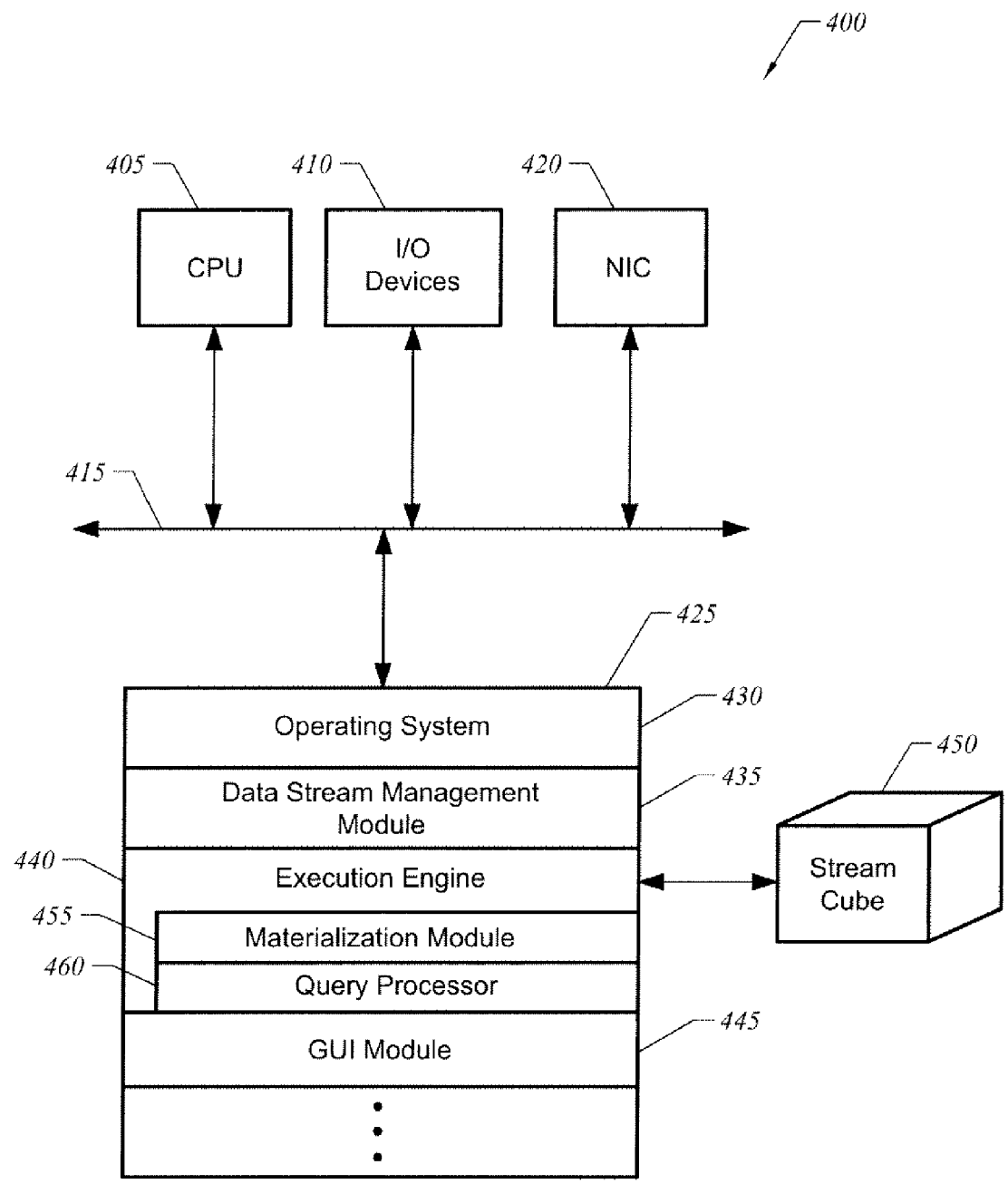
FIG. 4 illustrates a computer constructed in accordance with an embodiment of the invention.

FIG. 4 illustrates a computer in accordance with an embodiment of the invention. Computer 400 includes standard components, including a Central Processing Unit ("CPU") 405 and input/output devices 410, which are linked by a bus 415. Input/output devices 410 may include a keyboard, mouse, display screen, monitor, printer, and the like.

Network Interface Card ("NIC") 420 may also be connected to the bus 415. NIC 420 may have different data rates and provides connectivity to a wired or a wireless network (not shown), thereby allowing computer 400 to operate in a networked environment. Memory 425 is also connected to the bus 415. In one exemplary embodiment, memory 425 stores one or more of the following modules: an Operating System module 430, a Data Stream Management module 435, an Execution Engine 440, and a GUI module 445. Operating System module 430 may include instructions for handling various system services, such as file services or for performing hardware dependant tasks, Data Stream Management module 435 may include executable instructions for managing different data sources, receiving data from those data sources, and producing structured, time-stamped data streams from the received data. Each data stream has a fixed schema containing predefined dimensions, attributes, and measures.

According to an embodiment of the invention, Execution Engine 440 may include executable instructions to process the data streams generated by Data Stream Management module 435 into a stream cube 450. Stream cube 450, as described above and appreciated by one of ordinary skill in the art, consists of a plurality of sub-cubes associated with a plurality of time ranges in a tilted time frame. Each sub-cube consists of a number of cuboids, with each cuboid aggregating multi-dimensional data at a given level of granularity and at a given time range.

In one embodiment, as described in more detail herein below, the data streams are processed into stream cube 450 by recording them into the m- and o-layers of the sub-cube associated with the time range corresponding to the data streams' timestamps. As appreciated by one of ordinary skill in the art, recording a data stream into the m- and o-layers involves updating the measures computed for those layers to reflect the measures' values in the data stream. Additionally, as described in more detail herein below, stream cube 450 may be materialized along a materialization path between the m- and o-layers. In this case, the data streams are also recorded into the cuboids along the materialization path.

Execution Engine 440 includes a Materialization module 455 for determining when and how to materialize stream cube 450. Depending on system conditions, such as, for example, data rates, memory availability and storage space, stream cube 450 may be materialized as requested. Alternatively, a dynamic materialization path may be repeatedly computed according to a predetermined criterion and a cost function. The predetermined criterion, described in more detail herein below, determines when to compute the dynamic materialization path, such as, for example, at every user query, at given time intervals, or depending on the change in users' requests. The cost function, also described in more detail herein below, determines the factors used to determine the dynamic materialization path. Those factors take into account the dynamic nature of users' requests and system conditions.

Execution Engine 440 also includes a Query Processor 460 for processing, planning, and optimizing users' queries for data stored on stream cube 450. Query Processor 460 may operate in conjunction with GUI module 445, which relies upon standard techniques to produce graphical components of a graphical user interface ("GUI"), e.g., windows, icons, buttons, menu and the like, for accessing and managing data on stream cube 450. For example, in one embodiment, the GUI may be used to formulate queries for data stored on stream cube 450 and to display the query results to users. The GUI may also be used by data analysts to describe the schema of different data sources and the parameters required to convert the data received from those data sources into the structured, time-stamped data streams.

It is appreciated that the executable modules stored in memory 425 are exemplary. It is also appreciated that the functions of the modules may be combined. In addition, the functions of the modules need not be performed on a single computer. Instead, the functions may be distributed across a network of computers, if desired.

Indeed, the invention may be commonly implemented in a client-server environment with various components being implemented at the client-side and/or the server-side, or, alternatively, in a peer-to-peer or other such networking environment. For example, one of ordinary skill in the art appreciates that the unctions of modules 435-445 may be performed at computer 400 or at a server connected to computer 400. In one exemplary embodiment, some or all of the functions of modules 435-445 may be performed at computer 400. In another exemplary embodiment, some or all of the functions of modules 435-445 may be performed at a server connected to computer 400. In yet another exemplary embodiment, multiple execution engines 440 supporting multiple stream cubes 450 may be used for computing different measures over different data streams. As appreciated by those of ordinary skill in the art, it is the functions of the invention that are significant, not where they are performed or the specific manner in which they are performed.

As also appreciated by one of ordinary skill in the art, stream cube 450 may be hosted by a content provider, e.g., a BI/BAM providers in a web site accessed by multiple users. Accordingly, the functions of modules 435-445 may be performed at a web server hosting the web site. Users of stream cube 450 may access the web site to access, manage, and analyze their data stored in stream cube 450.

Figure 5:
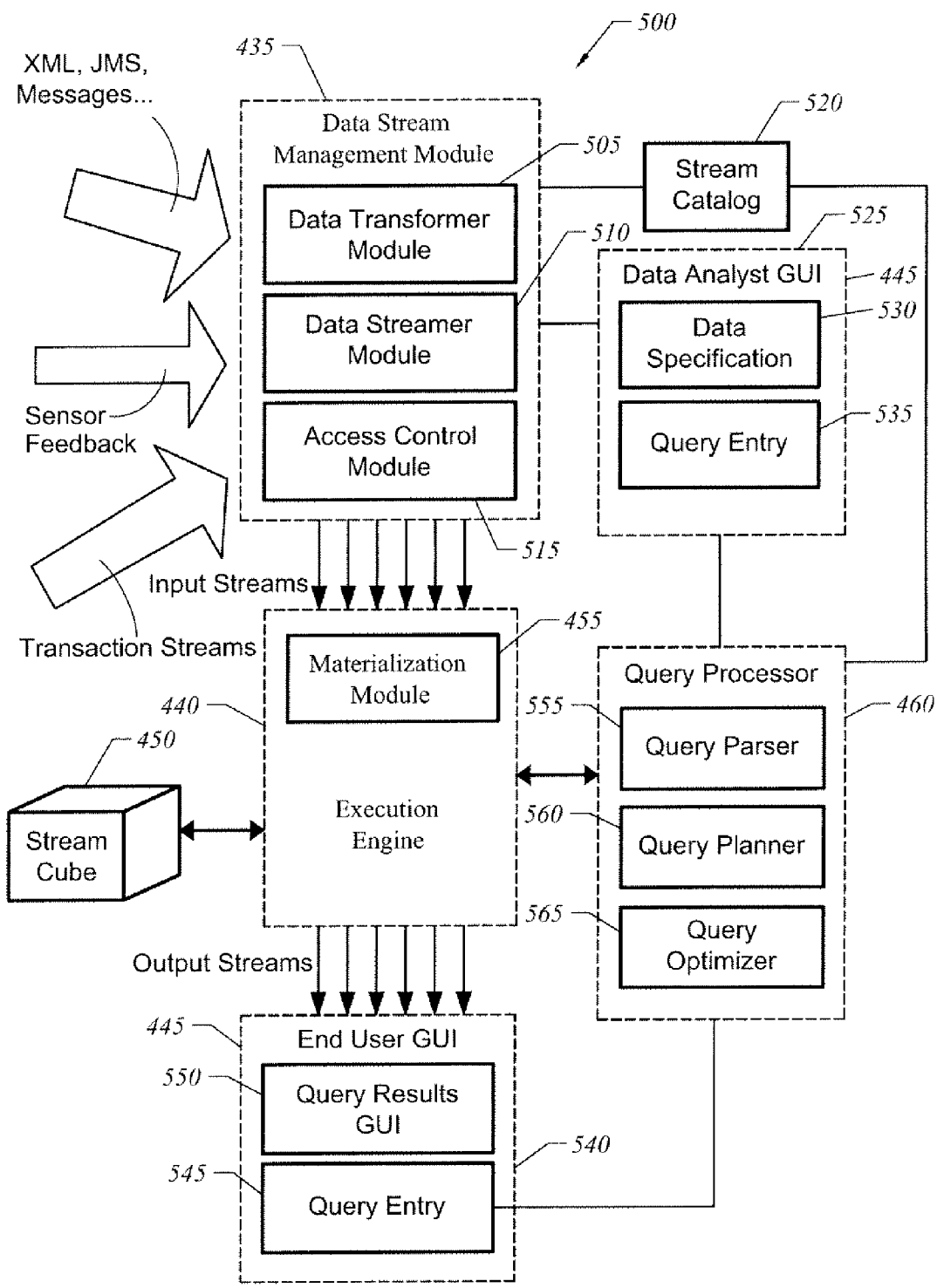
FIG. 5 illustrates a BAM architecture in which embodiments of the invention may operate.

Referring now to FIG. 5, a DAM architecture in which embodiments of the invention may operate is described. DAM architecture 500 illustrates the different modules of computer 400 and the relationships between them. Data Stream Management module 435 is the entry point of BAM architecture 500, listening to multiple data sources and producing structured, time-stamped data streams from data received from those data sources. The data sources can include both pull and push data sources. Pull data sources require Data Stream Management module 435 to actively poll the data sources for data, while push data sources send push data events, e.g., transactions and messages, to Data Stream Management module 435.

Data Stream Management module 435 may include a Data Transformer module 505, a Data Streamer module 510, and an Access Control module 515. The Data Transformer module 505 is responsible for converting the data received from the multiple data sources into the structured data streams. The Data Streamer module 510 sends the data streams into Execution Engine 440 for processing and adds a timestamp to each data stream marking the time the data stream is released to Execution Engine 440. In one embodiment, Data Streamer module 510 may also control the flow rate of the data streams into Execution Engine 440. Access Control module 515 controls the access to stream cube 450, that is, the users and their access to data stored in stream cube 450. That is, users can only request data or measures of data that they have rights or privileges to access.

A Stream Catalog 520 interacts with Data Stream Management module 435 to describe the schema of the multiple data sources and the parameters required to convert the received data into the structured, time-stamped data streams. Data analysts may use Stream Catalog 520 to define dimension hierarchies for any given dimension. As appreciated by one of ordinary skill in the art, these hierarchies represent an order of abstraction levels for the given dimension.

For example, {StoreID<Street<City<State<Country<Continent<all} may represent a hierarchy for the region dimension. The different abstraction levels are mapped into different layers of stream cube 450. For example, StoreID may be an abstraction level at the m-layer while all may be at the o-layer (which one of ordinary skill in the art appreciates that it may coincide with the apex cuboid).

Data analysts may define the dimension hierarchies using GUI module 445. GUI module 445 may generate a Data Analyst GUI 525 for use by data analysts to describe the schema (including their dimension hierarchies) of the multiple data sources and the parameters required to convert the received data into the structured, time-stamped data streams. Data Analyst GUI 525 may include a Data Specification module 530 for defining the schema and the parameters required for generating the structured, time-stamped data streams. Data Analyst GUI 525 may also include a Query Entry module 535 to enable data analysts to define sample query templates for querying stream cube 450.

Users may define queries for stream cube 450 using Query Entry module 545 within End User GUI 540, also generated by GUI module 445. End User GUI 540 may be used by users to formulate queries for data stored on stream cube 450 using Query Entry module 545 and to display the query results to users using Query Results GUI 550. The queries formulated in Query Entry module 545 are processed by Query Processor 460, where they are parsed in Query Parser 555, planned in Query Planner 560, and optimized in Query Optimizer 565. After processing, the queries are executed by Execution Engine 440.

Execution Engine 440 also records the data streams received from Data Stream Management module 435 into stream cube 450. A Materialization Module 455 within Execution Engine 440 is used to determine when and how to materialize stream cube 450, as described in more detail herein below.

It is appreciated by one of ordinary skill in the art that the modules of BAM architecture 500 illustrated in FIG. 5 are shown for purposes of illustration only. Additional modules (not shown) may be included within DAM architecture 500 or the displayed modules may be changed and or/combined. For example, Query Processor 460 may be a module within Execution Engine 440. It is also appreciated by one of ordinary skill in the art that BAM architecture 500 may be a client-server, peer-to-peer, or any other type of architecture. For example, End User GUI 540 may be used by users in a client computer to query stream cube 450, which may be stored in a server computer.

Figure 6:
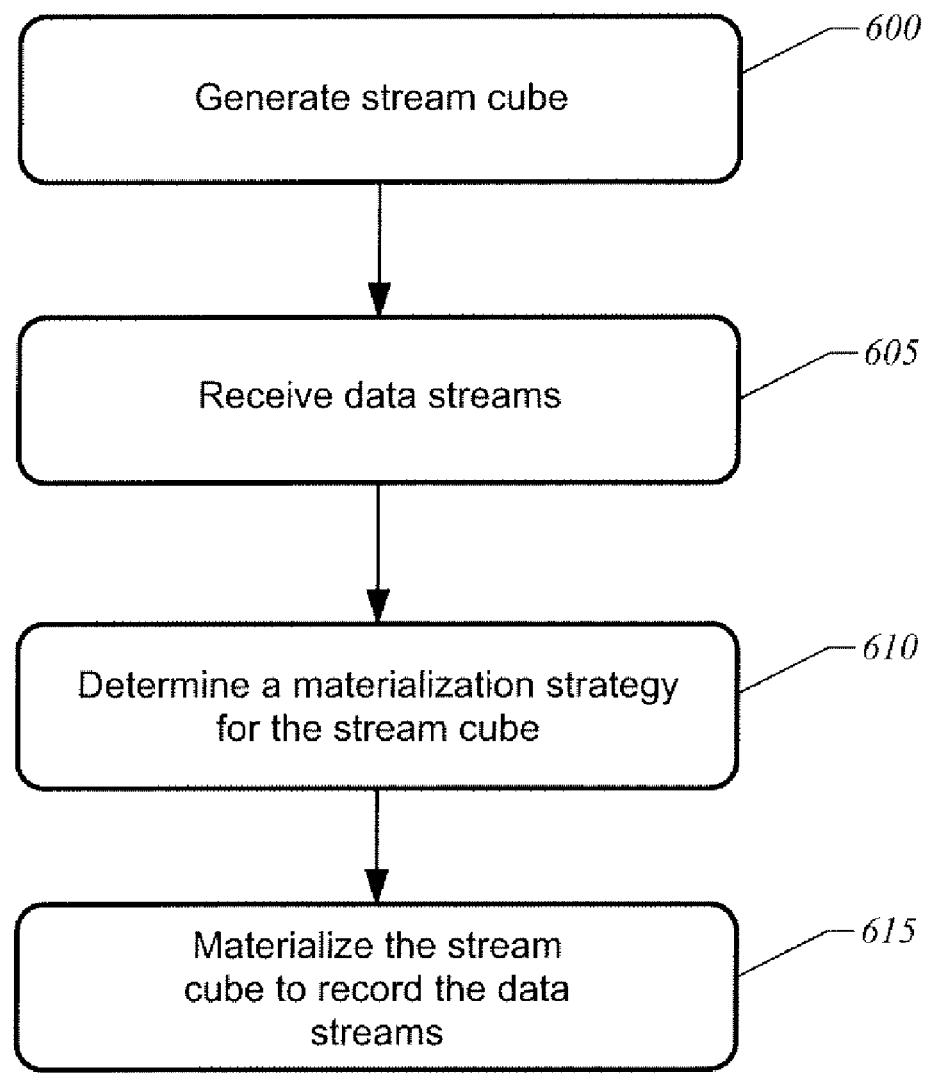
FIG. 6 illustrates a flow chart for managing data streams in a stream cube in accordance with an embodiment of the invention.

FIG. 6 illustrates a flow chart for managing data streams in a stream cube in accordance with an embodiment of the invention. First, a stream cube is generated to store data received from multiple data sources (600). As described herein below, this involves generating a plurality of sub-cubes in a tilted time frame. Next, structured, time-stamped data streams are received to capture the received data (605). The data streams are recorded into the stream cube depending on a materialization strategy. According to an embodiment of the invention, this materialization strategy is repeatedly determined based on system conditions and users' requests (610). Lastly, the stream cube is materialized to process the generated data streams according to the selected materialization strategy (615).

The materialization strategy may involve: (1) on-demand materialization, in which case cuboids can be computed on demand if desired; (2) full materialization, in which case all cuboids in the stream cube are updated upon arrival of data streams; or (3) partial materialization, in which case only a subset of the cuboids are updated along a "materialization path" between the m-layer and the o-layer.

The predetermined criterion determines which one of these three options to adopt and when to compute the dynamic materialization path in case the latter option is adopted. The predetermined criterion may be evaluated, for example, at every user query, at given time intervals, or depending on the change in users' requests. The cost function, also described in more detail herein below, determines the factors used to determine the dynamic materialization path. Those factors take into account the dynamic nature of users' requests and system conditions.

It is appreciated that the materialization strategy is repeatedly determined to take into account varying system conditions and users' requests. It is also appreciated that the materialization strategy may be repeatedly changed accordingly. For example, the stream cube may be initially fully materialized. As the data streams arrive to be recorded into the stream cube and memory availability changes, for example, the materialization strategy may be changed into a partial materialization strategy so that only those cuboids along a materialization path are computed.

Figure 7:
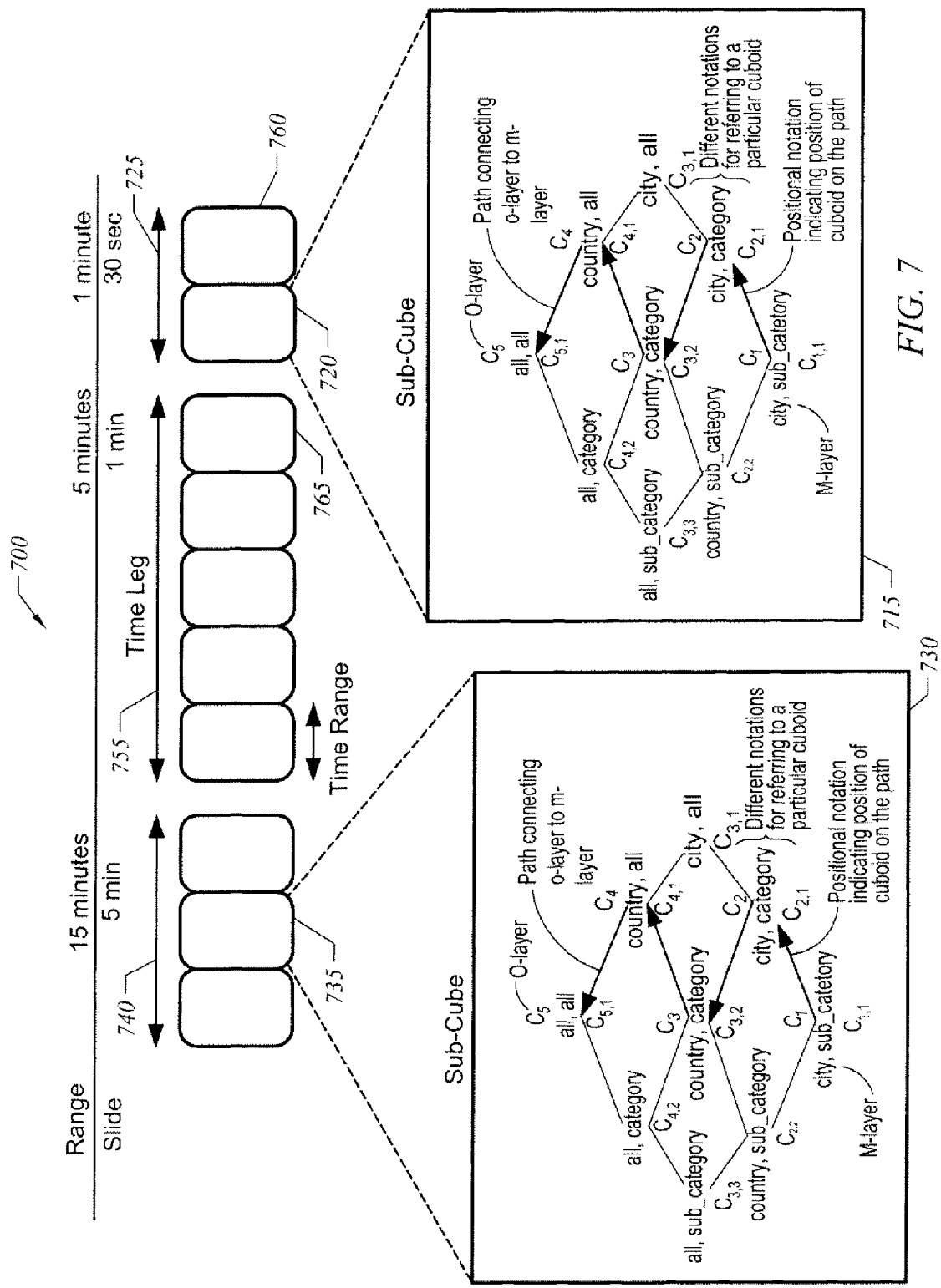
FIG. 7 illustrates a schematic diagram for a stream cube constructed in accordance with an embodiment of the invention.

Referring now to FIG. 7, a schematic diagram for a stream cube constructed in accordance with an embodiment of the invention is described. Stream cube 450 consists of a plurality of sub-cubes associated with a plurality of time ranges in a tilted time frame 700. Each sub-cube consists of a number of cuboids, with each cuboid aggregating multi-dimensional data at a given level of granularity and at a given time range. For example, a base cuboid within a given sub-cube aggregates measures for every possible combination of dimensions for its associated time range. Another cuboid within the given sub-cube, commonly referred to as the apex cuboid, aggregates measures over all dimensions for its associated time range.

In one embodiment, sub-cubes are grouped by legs or sections of time within the tilted time frame. A leg of time in a tilted time frame represents a group of time ranges with each time range associated with a given sub-cube. For example, sub-cube 715 is associated with time range 720 in leg 725 and sub-cube 730 is associated with time range 735 in leg 740. Leg 725 represents the granularity of one minute and is divided into two time ranges of thirty seconds each. Time range 720 within leg 725 represents the last thirty seconds within the one minute. Similarly, leg 740 represents the granularity of fifteen minutes and is divided into three time ranges of five minutes each (with time range 735 corresponding to the middle range).

As appreciated by one of ordinary skill in the art, data from a given data stream is recorded into the sub-cube associated with the time range corresponding to the data stream's timestamp. For example, data arriving more than a minute ago is recorded in one of the sub-cubes associated with leg 725, e.g., sub-cube 715, and data arriving more than fifteen minutes ago is recorded in one of the sub-cubes associated with leg 740, e.g., sub-cube 730.

Figure 8:
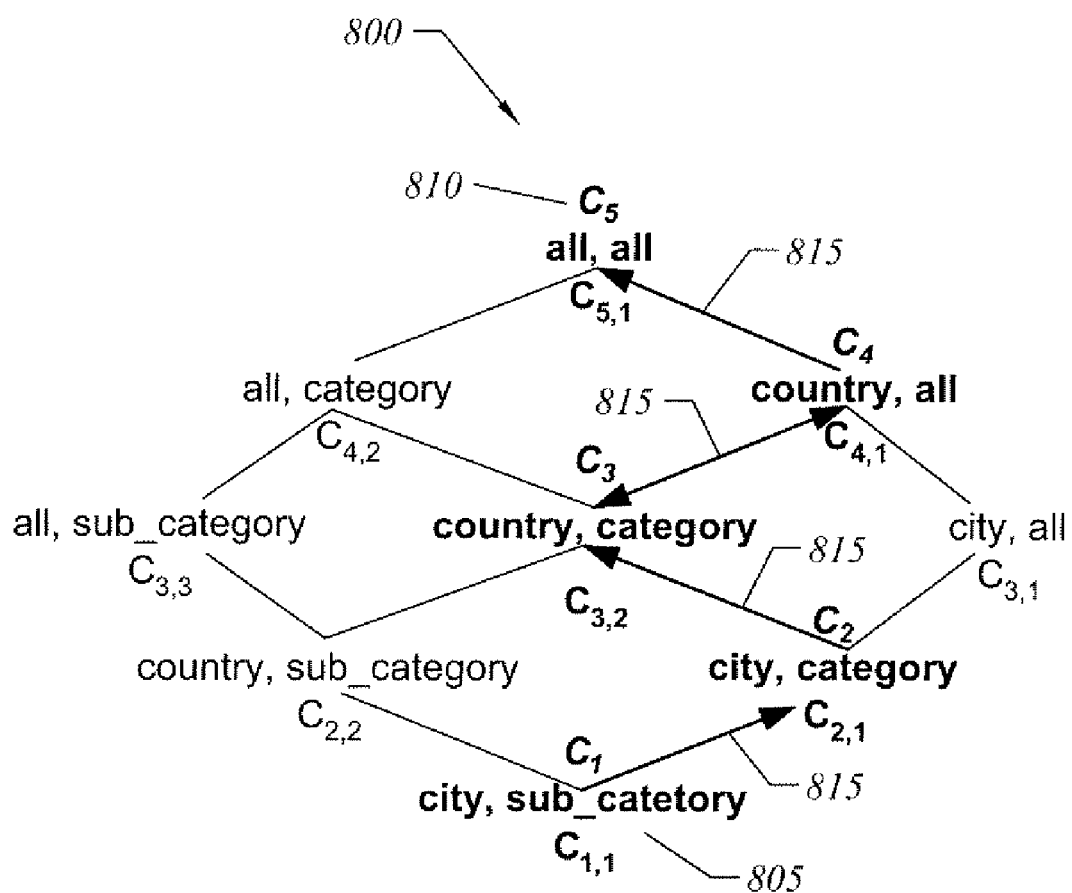
FIG. 8 illustrates a sub-cube constructed in accordance with an embodiment of the invention.

FIG. 8 illustrates a sub-cube constructed in accordance with an embodiment of the invention. Sub-cube 800 is a 2-D data cube with dimensions region and product. The region dimension has three abstraction levels {city, country, all} and the product dimension also has three abstraction levels {sub_category, category, all}. Sub-cube 800 has an m-layer 805 that aggregates the dimensions region and product to their lowest abstraction levels (i.e., city and sub_category), and an o-layer 810 that aggregates all dimensions. O-layer 810 corresponds to the apex cuboid of sub-cube 800.

In one embodiment, m- and o-layers 805-810 are always materialized and computed. All cuboids outside those layers cannot be computed on demand. All cuboids between those layers are reachable or could be computed on demand according to a materialization strategy, as described in more detail herein below. For example, the materialization strategy may involve computing all the cuboids between 805-810 or computing only those cuboids along a dynamic materialization path, such as path 815. The computation of the dynamic materialization path, as described in more detail herein below, is triggered by a predetermined criterion and depends on a cost function.

Figure 9:
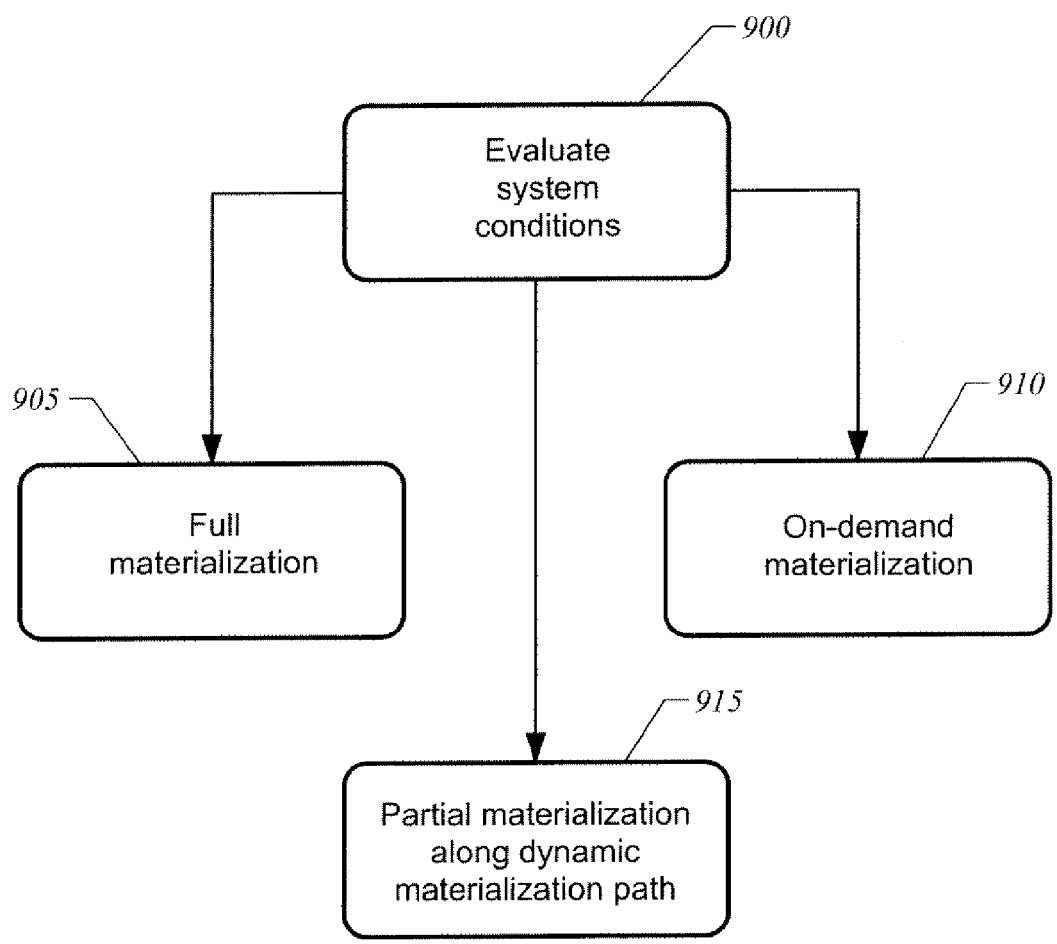
FIG. 9 illustrates a flow chart for determining a materialization strategy for the stream cube in accordance with an embodiment of the invention.

Referring now to FIG. 9, a flow chart for determining a materialization strategy for the stream cube in accordance with an embodiment of the invention is described. The materialization strategy is determined based on the current system conditions, including, but not limited to, data rates, memory availability, and storage space, and on the user's requests to the stream cube (900). When memory and storage space are available, the stream cube may be fully materialized, that is, all cuboids within every sub-cube along the tilted time frame 700 are computed (905). The stream cube may also be materialized on-demand (910), that is, cuboids are materialized as requested. Alternatively, the stream cube may be partially materialized along a materialization path that is dynamically computed (915). In this case, only those cuboids in the m- and o-layers and along the materialization path between the m- and o-layers are materialized or computed.

It is appreciated by one of ordinary skill in the art that this materialization strategy may evolve dynamically. That is, the system conditions and users' requests are repeatedly evaluated over the duration of the stream cube to assess whether additional or fewer cuboids should be materialized at any given time. In one embodiment, the partial materialization strategy is adopted. This strategy may be revisited as the system conditions and users' requests change. For example, cuboids that are off the dynamic materialization path may be materialized as additional memory and storage space become available.

Figure 10:
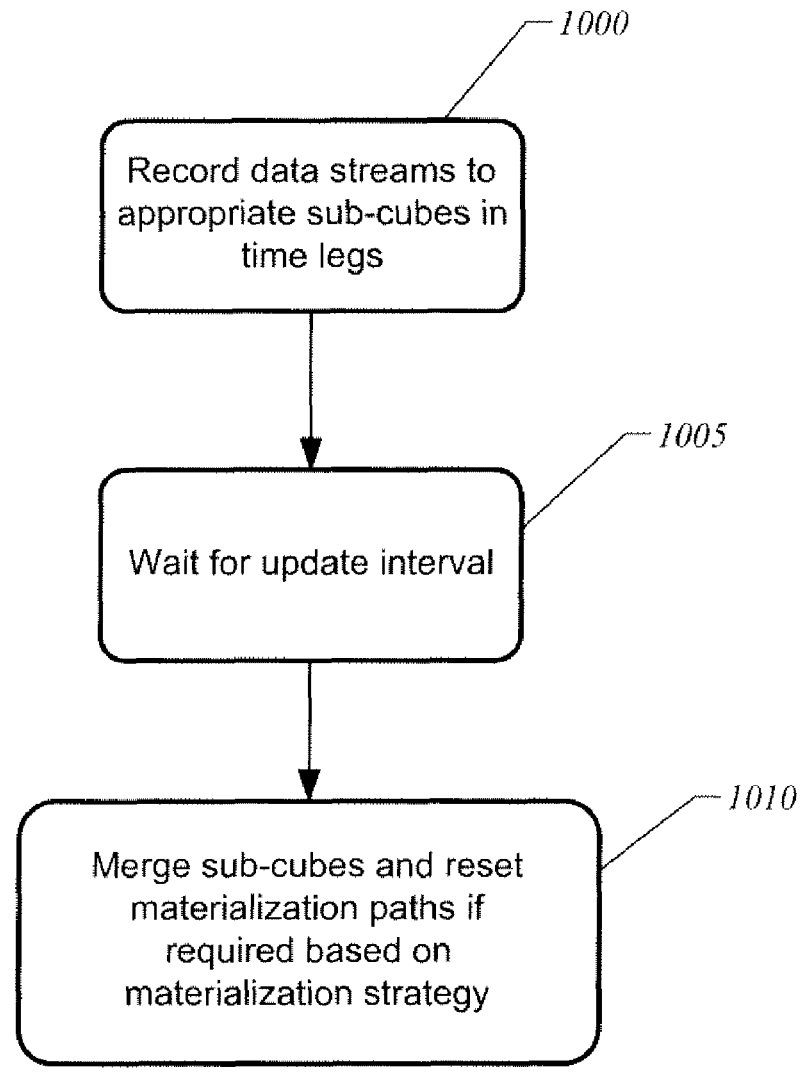
FIG. 10 illustrates a flow chart for recording data streams into a stream cube in accordance with an embodiment of the invention.

Referring now to FIG. 10, a flow chart for processing data streams into a stream cube in accordance with an embodiment of the invention is described. First, the data streams are recorded into appropriate sub-cubes (1000). This involves mapping the data streams' timestamps into one of the time ranges in tilted time frame 700 (described above with reference to FIG. 7). The data streams are recorded in their corresponding sub-cubes whenever a new tuple arrives on a data stream. The new tuple is automatically recorded into the m-layer of the stream cube. Depending on the materialization strategy (e.g., a partial materialization strategy), the new tuple may also be recorded along all the cuboids (from the m-layer to the o-layer) along a materialization path.

Each time leg in tilted time frame 700 has an update interval (1005). For example, time leg 755 has a one-minute update interval. This interval represents a periodic interval at which users are given answers to their queries. So if a user is interested, say, in measures of (country, all) in the last five minutes, then they get an answer at every minute.

Lastly, at every update interval for a given time leg, sub-cubes within the time leg are merged to produce a single sub-cube containing all measures aggregated from the sub-cubes in the different time ranges within the time leg (1010). Measures in the merged sub-cube are then returned to users. The oldest sub-cube within the time leg is cleared and a new or merged cube is inserted in its place. As described in more detail herein below, the materialization paths of the other sub-cubes in the time leg are also reset depending on the materialization strategy.

For example, at every thirty seconds, the sub-cubes of the one-minute time leg (725) are merged. Measures in the merged sub-cube are returned to the users. The oldest sub-cube (720) of this leg (725) is then cleared. Sub-cube (760) is shifted into sub-cube 720 and a new sub-cube 760 is inserted. This new sub-cube 760 records all new tuples that arrive in the next thirty seconds.

Similarly, at every minute, the one-minute sub-cubes of the five-minute leg (755) are merged, the stream cube returns measures from the merged cube to users, and the oldest sub-cube in the five-minute leg is cleared. All sub-cubes are then shifted. The merged sub-cube of the previous one-minute leg (725) is then inserted in the five-minute leg (755) at position 765. At every five minutes, the stream cube also merges the three five-minute sub-cubes in the fifteen-minute leg (740) and returns measures of the merged sub-cube to users. The oldest five-minute sub-cube is discarded and the merged five-minute sub-cube from the previous leg is inserted in the fifteen-minute leg (740).

Figure 11:
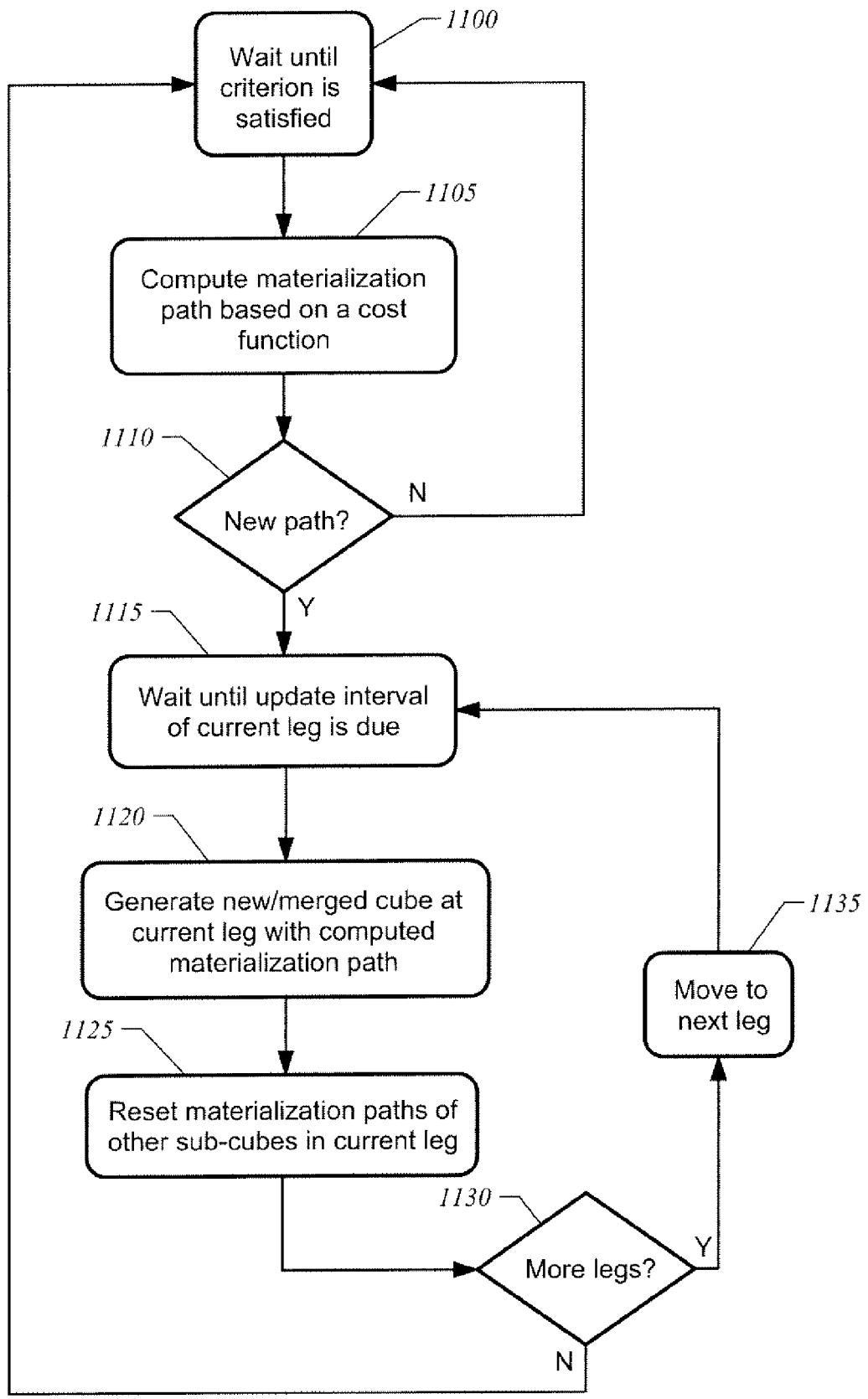
FIG. 11 illustrates a flow chart for processing data streams into a stream cube according to a partial materialization strategy in accordance with an embodiment of the invention.

FIG. 11 illustrates how data streams are recorded into the stream cube when a partial materialization strategy is adopted. In this case, the recordation of the data streams is subject to a materialization path that is dynamically computed, as described in more detail herein below. First, a pre-determined criterion is evaluated to determine whether it is time to compute a new materialization path (1100). The pre-determined criterion may include, but is not limited to: (1) a query-based criterion; (2) a threshold-based criterion; and (3) a time-based criterion. The query-based criterion may involve computing a new materialization path whenever a new query is made or an existing query changes or is removed. The threshold-based criterion may involve computing a new materialization path whenever the number and/or type of user requests change by a given threshold. The time-based criterion may involve computing a new materialization path at a given time interval, for example, at every hour.

Once the pre-determined criterion is satisfied, the dynamic materialization path is computed based on a cost function, described in more detail herein below (1105). This involves comparing the costs and effects of all possible paths in the stream cube to select the path that (1) satisfies more user requests, (2) allows for smoother future changes to other materialization paths, yet (3) consumes less main memory, relative to all other paths. The cost and effects of any given possible materialization path are determined by examining the cost and effects of each cuboid along the path.

It is appreciated that a single materialization path is determined for all sub-cubes in tilted time frame 700 at any given time. This is accomplished by computing the dynamic materialization path based on the dimensions and abstraction levels stored in the sub-cubes, regardless of the values of the measures stored for those dimensions and abstraction levels within each sub-cube. That is, the dynamic materialization path is computed independently of the values stored within each sub-cube.

The computed dynamic materialization path may be the same as an existing materialization path or it may be a different path altogether (1110). If the computed dynamic materialization path is the same as the existing path, then no updates to the materialization path are necessary to be made on the sub-cubes in tilted time frame 700. In this cases the stream cube continues its operation without changes to its materialization path. The cuboids along the materialization path are then aggregated to reflect the data streams recorded in the m-layer.

Otherwise, if the computed dynamic materialization path is different than the existing materialization path, then each sub-cube needs to be updated to reflect the new path and to record the data streams according to the new path. The sub-cubes are updated whenever an update interval of a given leg in tilted time frame 700 is due (1115). Updating the sub-cubes in a given leg involves either generating a new sub-cube with the new materialization path (e.g., the first sub-cube in the first leg of tilted time frame 700) or merging all the sub-cubes in the previous leg to produce a single sub-cube representing the aggregation of all measures maintained within that previous leg (1120). For example, at every thirty seconds, the oldest sub-cube (720) is discarded or cleared. The sub-cube within time range 760 is then shifted into sub-cube 720 and a new sub-cube is inserted at time range 760. At every minute, the two thirty second sub-cubes, i.e., the sub-cubes within time ranges 720 and 760, are merged to form a one-minute sub-cube. This merged sub-cube is inserted into the first time range of the next time leg, i.e., time range 765 in time leg 755, when its update interval (i.e., every minute) is due.

Before generating a merged sub-cube for a given time leg, the sub-cubes within the leg have to be refreshed to have their materialization paths updated to the new computed path (1125). This is because if sub-cubes within a given time leg have different materialization paths, sub-cubes with older materialization paths have to re-compute cuboids that are par of the recent materialization path (but outside their path) before a merger could occur. Since each merge operation forces such re-computations, it is more efficient to incur the cost of re-computation once, unify the materialization paths of all sub-cubes and drop measures computed in older materialization paths that are no longer pan of the most recent materialization path. After resetting the materialization paths of all sub-cubes within the current leg, the process is then repeated for any additional legs within the tilted time frame (1130-1135).

Figure 12:
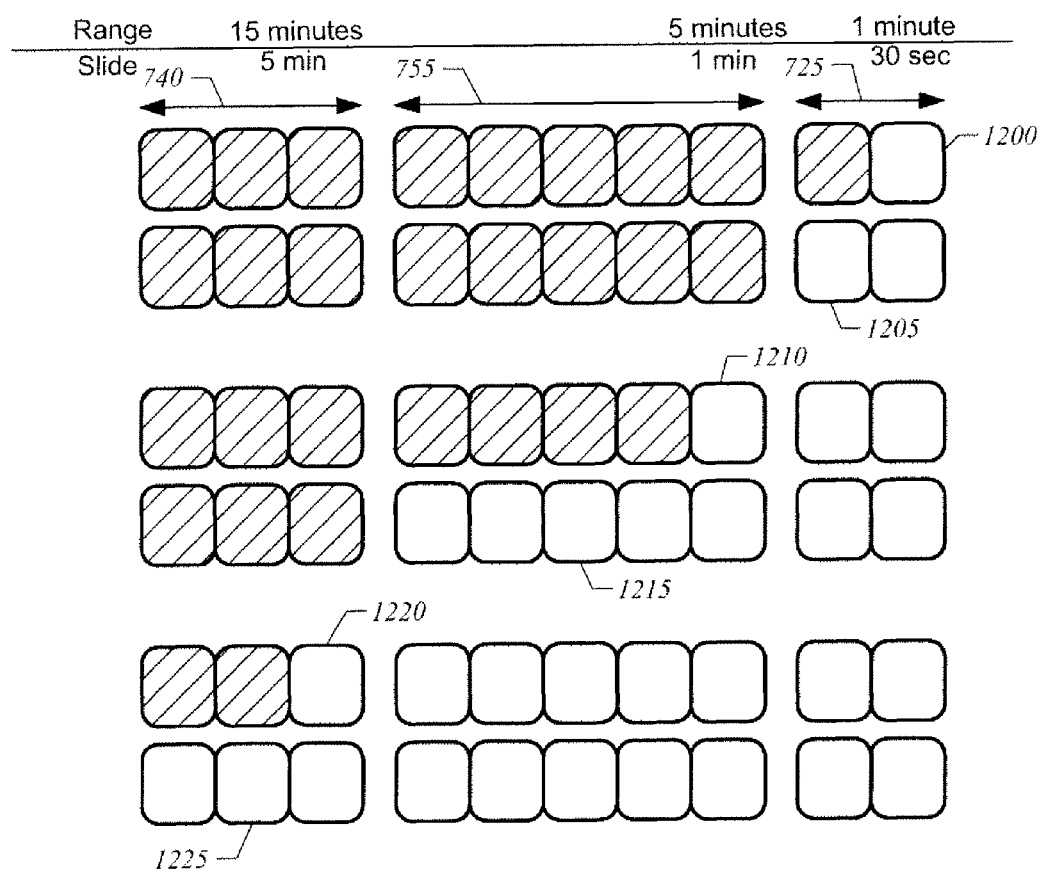
FIG. 12 illustrates a schematic diagram showing the updating of sub-cubes within a tilted time frame in accordance with an embodiment of the invention.

A schematic diagram illustrating bow sub-cubes are merged to record incoming data streams is shown in FIG. 12. The first leg of tilted time frame 700, i.e., leg 725 has a granularity of one minute and is divided into two time ranges of thirty seconds each, i.e., time range 720 and 760. At every thirty seconds, leg 725 is updated. As described above with reference to FIG. 11, this involves discarding the oldest sub-cube within leg 725 (sub-cube 720), shifting the sub-cube within time range 760 into its place, and creating a new sub-cube for time range 760 that reflects the incoming data streams. This new sub-cube may have a newly computed materialization path (1200). The other sub-cube (720) within leg 725 is then reset to the newly computed dynamic materialization path (1205). The data streams are then recorded into the sub-cubes within this leg.

At the next update interval, i.e., after one minute, a merged sub-cube is inserted into the five-minute time leg 755 (1210). This merged sub-cube represents the aggregation of all measures of the previous leg 725. The other sub-cubes within leg 755 are then reset to the newly computed dynamic materialization path (1215).

Similarly, at the next update interval, i.e., after five minutes, a merged sub-cube is inserted into the fifteen-minute time leg 740 (1220). This merged sub-cube represents the aggregation of all measures of the previous leg 755. The other sub-cubes within leg 740 are then reset to the newly computed dynamic materialization path (1225).

Figure 13:
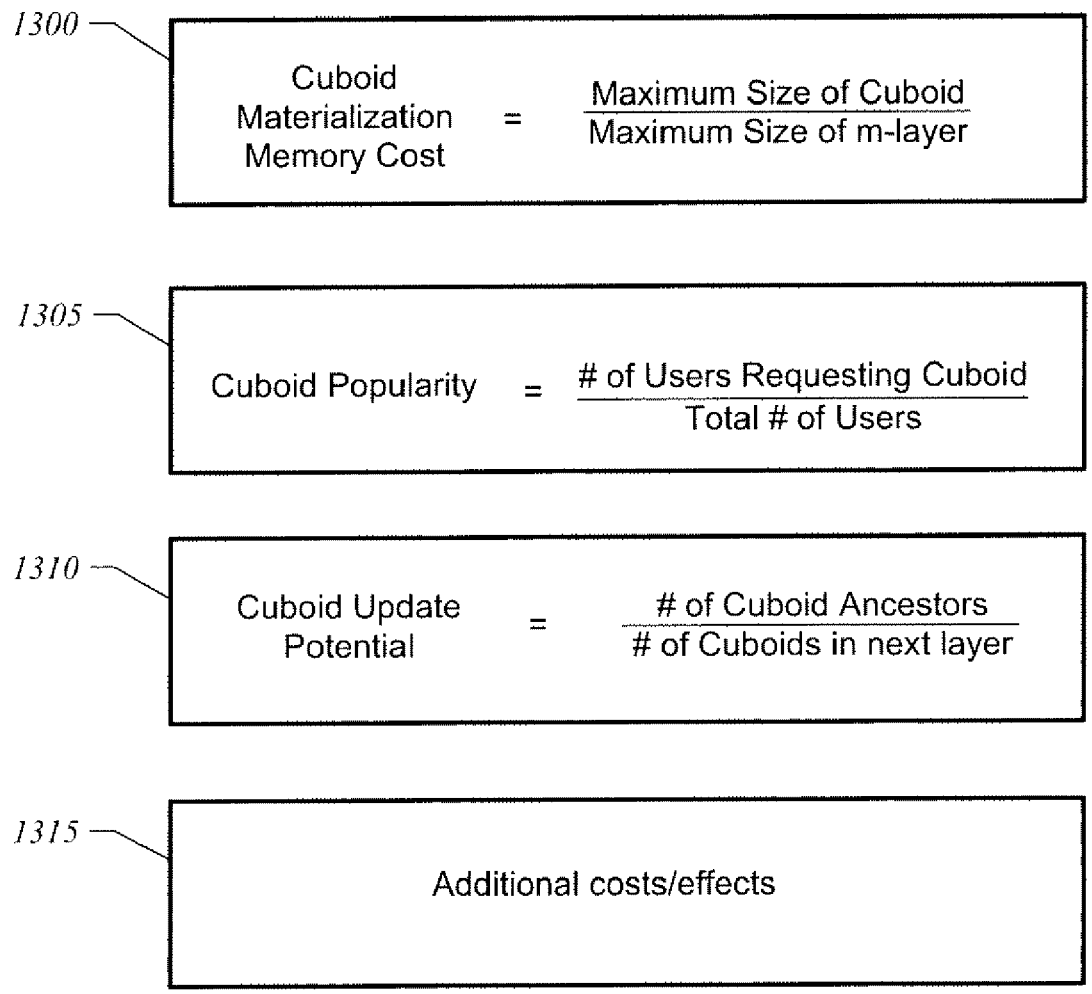
FIG. 13 illustrates a schematic diagram showing the parameters of a cost function for computing a dynamic materialization path in accordance with an embodiment of the invention.

As described herein above and according to an embodiment of the invention, the dynamic materialization path is computed based on a cost function. This involves comparing the costs and effects of all possible paths in the stream cube to select the path that (1) satisfies more user requests, (2) allows for smoother future changes to other materialization paths, yet (3) consumes less main memory, relative to all other paths. The cost and effects of any given possible materialization path are determined by examining the cost and effects of each cuboid along the path. These cost and effects are illustrated in FIG. 13.

The cost function used for computing the dynamic materialization path is based on parameters that include, but are not limited to: (1) cuboid materialization memory cost 1300; (2) cuboid popularity 1305, or the number of users that request a particular cuboid; and (3) cuboid update potential 1310, or the number of cuboids that could be incrementally updated by aggregating measures stored in the cuboid. Additional parameters 1315 may be included as desired.

The cuboid materialization memory cost 1300 for a cuboid $C_{i,j}$, where i is the level of the cuboid and j is the index of the cuboid at level i, may be expressed as:

$$c(C_{i,j}) = \frac{\text{maximum size of cuboid } C_{i,j}}{\text{maximum size of the } m\text{-layer}} = \frac{|C_{i,j}|}{|C_{1,1}|} \quad (1)$$

where $|C_{i,j}|$ represents the maximum size of cuboid $C_{i,j}$ and $|C_{1,1}|$ represents the maximum size of the m-layer.

Each cuboid is defined by a tuple of dimensions. The value of the tuple corresponds to the abstraction level of each dimension represented in the tuple. Each abstraction level within a dimension contains a set of unique values. The magnitude of the set decreases with higher abstraction levels. The highest abstraction level or the apex cuboid has only one unique value. Therefore, if dimension $D_i$ has n abstraction levels $A(D_i) = \{a_1, a_2, \ldots, a_n\}$, then $|a_1| \geq |a_2| \geq \ldots \geq |a_n| = 1$. If a cube has dimensions $(D_1, \ldots, D_m)$, then a cuboid C is defined by $(c_1, \ldots, c_m)$, where $c_1 \in A(D_1)$. The maximum size of a cuboid C may therefore be expressed as:

$$|C| = |(c_1, \ldots, c_m)| = |c_1| \times \ldots \times |c_m| = \prod_{i=1}^{m} |c_i| \quad (2)$$

For example, suppose there are two dimensions: region and product type. The dimension region may have three abstraction levels: A(region)={city, country all}. The dimension product type may also have three abstraction levels: A(product type)={sub_category, category, all}. The size of a cuboid calculating measures across city and category is |C|=|(city, category)|=|city|×|category|. If the organization has, say, branches in ten cities and five product categories, then this cuboid has a size of at most fifty unique combinations of city and category values and their associated measures.

The cost of a cuboid in computing Equations (1) and (2) above is assumed to be its maximum size. As appreciated by one of ordinary skill in the art, run-time cuboid size may depend on the nature of the dimensions and not necessarily on maximum cuboid size. For example, not all product sub-categories may have data accumulated in a one week period. The region dimension, however, may have uniform sales across all cities in a twenty-four hour period. The cuboid (city, all) may therefore attain its maximum size easily. This may not be the case for all the cuboids. Statistics may need to be gathered by data analysts to determine if adjustments are necessary to Equations (1) and (2) above to take this into account.

As further appreciated by one of ordinary skill in the art, dimensions in a stream cube consist of a number of abstraction levels with a finite number of values. This is natural of discretized abstraction levels such as, for example, cities, but other dimensions such as the price of a product may need to be discretized by a data analyst before Equations (1) and (2) above can be computed. For example, price may need to be discretized into {<100$, 100-500$, 500-1000$, >1000$}, and so on.

Besides cuboid materialization memory cost 1300, the other parameters in the cost function that need to be computed include, but are not limited to, cuboid popularity 1305 and cuboid update potential 1310. Cuboid popularity 1305 represents the number of users currently requesting measures from the cuboid. To normalize cuboid popularity 1305 to fall within a range of (0,1], the number of users requesting a particular cuboid is divided by the total number of users requesting data from any cuboid in the cube. Cuboid popularity 1305 may therefore be expressed as:

$$p(C_{i,j}) = \frac{\text{\# of users requesting } C_{i,j}}{\text{Total \# of users}} \quad (3)$$

Cuboid update potential 1310 represents the number of cuboids that could be incrementally updated from the measures maintained by a given cuboid C by grouping measures along a single dimension. Cuboid update potential 1310 is therefore equivalent to the number of ancestors a cuboid has. Accordingly, the cuboid update potential 1310 of a cuboid $C_{i,j}$ may then be expressed as:

$$u(C_{i,j}) = \frac{|\text{ancestors}(C_{i,j})|}{\text{\# of cuboids at layer } i+1} \quad (4)$$

Figure 14:
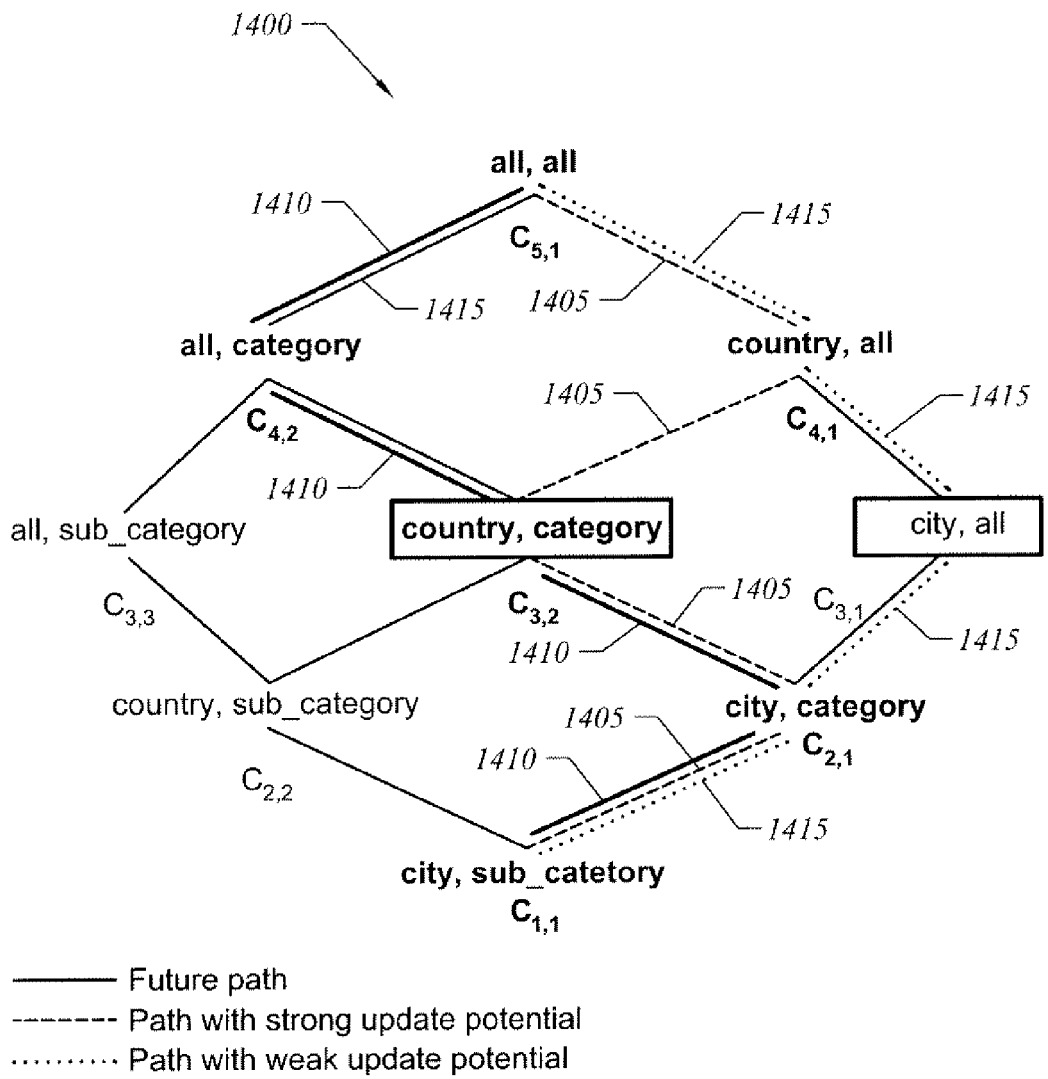
FIG. 14 illustrates a sub-cube and its cuboids' update potential in accordance with an embodiment of the invention.

The rationale for cuboid update potential 1310 is illustrated in FIG. 14. Stream cube 1400 is a 2-D cube representing data for dimensions region and product type. The region dimension has three abstraction levels, i.e., {city, country, all}, and the product type dimension also has three abstraction levels, i.e., {sub_category, category, all}. If a current materialization path for stream cube 1400 consists of path 1405 passing through cuboids (country, category) and (country, all), updating this path to a path 1410 which contains cuboid (all, category) instead of (country, all) would only require aggregating measures that are already materialized in the (country, category) cuboid.

However, if the current materialization path for stream cube 1400 consists of path 1415 passing through cuboids (city, all) and (country, all), a switch to path 1410 would require aggregating, measures in (city, category) to form cuboid (country category) and then aggregating measures in (country, category) to form cuboid (all, category). From this example, it is appreciated that cuboid (country, category) allows for future path changes with less computations in comparison to cuboid (city, all) because the cuboid (country, category) supports two ancestors while (city, all) only supports one ancestor.

Figure 15:
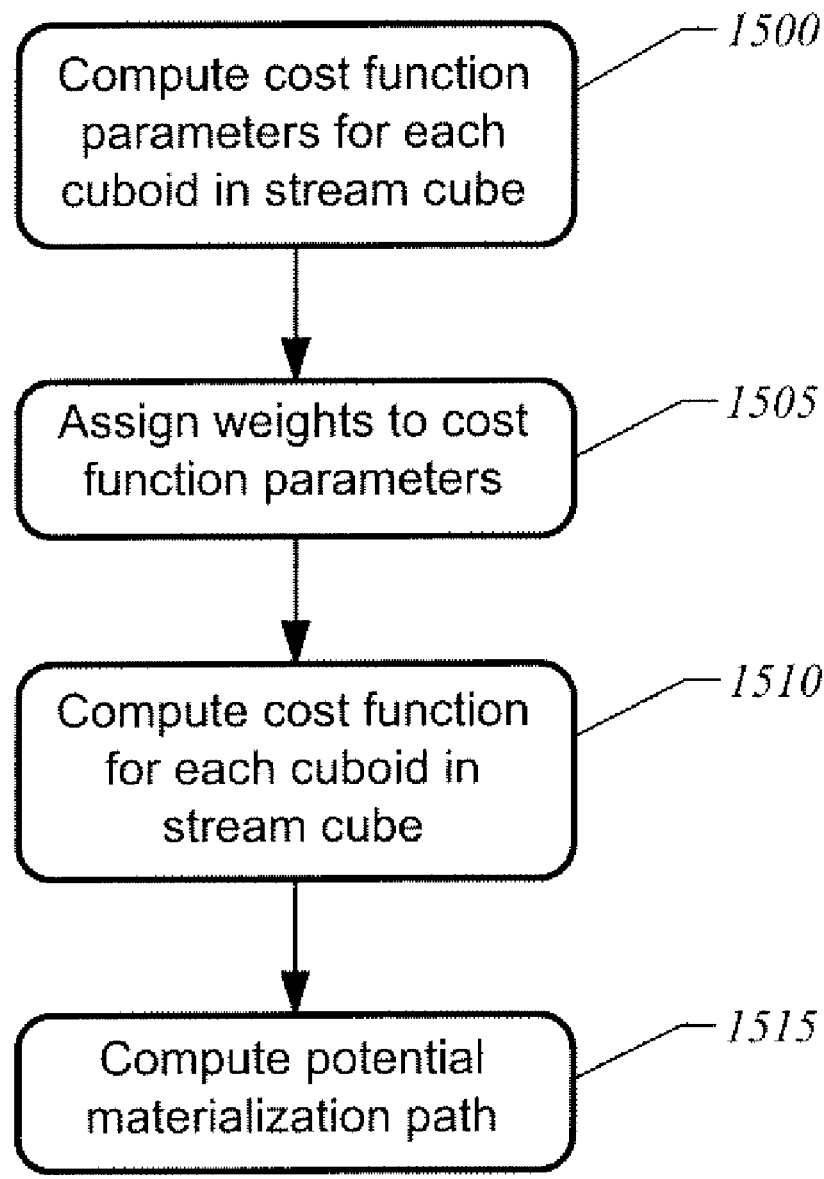
FIG. 15 illustrates a flow chart for computing a cost function for a given materialization path in a stream cube in accordance with an embodiment of the invention.

Referring now to FIG. 15, a flow chart for computing a cost function for a given materialization path in a stream cube in accordance with an embodiment of the invention is described. First, the cost function parameters 1300-1315 for each cuboid in the stream cube are computed as described above with reference to FIG. 13 (1500). Next, weights are assigned to the cost function parameters (1505) and the cost function for each cuboid is computed (1510). The cost function, or cost-effectiveness, $CE(C_{i,j})$ for a cuboid $C_{i,j}$ may be computed from Equations (1)-(4) above as:

$$CE(C_{i,j}) = -\alpha \cdot c(C_{i,j}) + \beta \cdot p(C_{i,j}) + \gamma \cdot u(C_{i,j}) \quad (5)$$

where $\alpha, \beta, \gamma$ are weights in the range of [0,1].

The values of weights $\alpha$, $\beta$, and $\gamma$ y are application-dependent. The weights add flexibility to the cost function by enabling it to adapt to different application requirements. For example, depending on the application and available resources, satisfying more user requests may be more important compared to main memory costs, hence $\beta$ may have a higher value compared to $\alpha$. It is appreciated that these weights may be constants or variables as desired. It is also appreciated that additional weights and parameters may be used to compute the cost function $CE(C_{i,j})$ above (e.g., additional parameters 1315). These additional cost function parameters may include, for example, bandwidth or data rates, query priority, computational cost of cuboids, and so on.

In one exemplary embodiment, the weights in equation (5) are adjusted so that $\beta$ has a high value. This favors the most popular path to materialize. It is appreciated that doing so reduces the time spent on the computation of cuboids outside the materialization path because these cuboids tend to be requested by fewer users. For example, the weights may be set as $\alpha=0.1, \beta=1, \gamma=0.1$. In another example, the weights may be set as $\alpha=1.0, \beta=0.1, \gamma=0.1$. this configuration favors materialization paths that consume less memory. In another example, the weights may be set as $\alpha=0.1, \beta=0.1, \gamma=1.0$: this configuration favors materialization paths that contain cuboids with a strong update potential.

Lastly, the cost-effectiveness of a potential materialization path in the stream cube is computed as the sum of cost-effectiveness of each cuboid in the potential path (1515). According to an embodiment of the invention, all potential materialization paths in the stream cube are evaluated to determine an optimal materialization path. This optimal materialization path is then selected as the materialization path for the stream cube. Determining this materialization path therefore amounts to the following optimization problem:

$$CE(C_{1,1} \ldots C_{i,j}) = \quad (6)$$
$$\begin{cases} CE(C_{1,1}) & \text{if } i = j = 1 \\ CE(C_{i,j}) + \max_{c_{j-i,k} \in descendants(c_{i,j})} CE(C_{1,1} \ldots C_{j-1,k}) & \text{otherwise} \end{cases}$$

As appreciated by one of ordinary skill in the art, this optimization problem may be solved using a number of optimization techniques, including, but not limited to, dynamic programming, simulated annealing, integer programming and so on. This optimization problem is solved in Materialization module 455 within Execution Engine 440.

Figure 16:
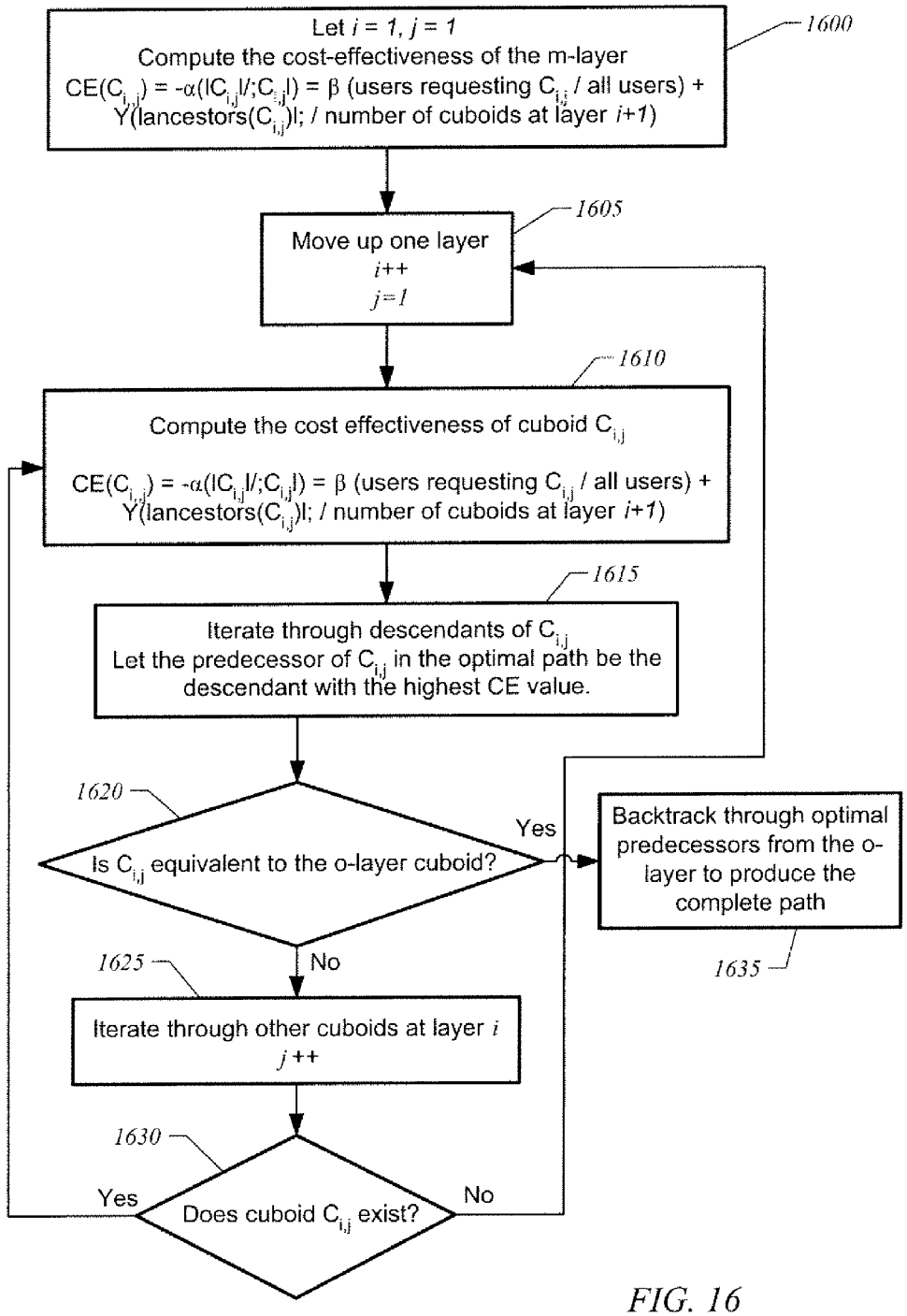
FIG. 16 illustrates a flow chart for computing a dynamic materialization path using dynamic programming in accordance with an embodiment of the invention.

For example, a dynamic programming technique for solving the optimization problem in Equation (6) above is illustrated in a flow chart in FIG. 16. First, the cost function for the cuboids in the m-layer is computed (1600). Then, the dynamic programming technique iterates through all cuboids from the m-layer to the o-layer (1605), computing the cost function at each cuboid (1610). At each cuboid, a predecessor cuboid that produces an optimal path from the m-layer to that cuboid is determined (1615). The predecessor cuboids and the optimal cost function for each cuboid are stored.

These same steps (1610-1615) are repeated until all cuboids in the stream cube from the m-layer to the o-layer have been processed (1620-1630). Once all optimal paths from the m-layer to all other cuboids in the cube are computed, the optimal materialization path is determined by backtracking from the o-layer cuboid and selecting the predecessor cuboids to be part of the optimal materialization path until it reaches the m-layer (1635).

It is appreciated that this dynamic programming technique has a theoretical cost that depends on the number of dimensions and abstraction levels for each dimension. In a cube of m dimensions and at most n abstraction levels for each dimension, the total number of cuboids is $m^n$. At each cuboid visited, the dynamic programming technique visits all descendants to retrieve the cost function of a path terminating at each descendant. Each cuboid has at most m descendants. Therefore, the theoretical cost associated with the computation of a path ending at each cuboid is $O(m^{n+1})$.

The length l of the generated materialization path, including the m-layer and the o-layer is $m(n-1)+1$. Therefore, backtracking from the o-layer to the m-layer to build the optimal materialization path is at most $O(m(n-1))$. The total theoretical cost for the dynamic programming technique is therefore $O(m^{n+1})$ given a fixed number of dimensions and abstraction levels.

One of ordinary skill in the art appreciates that a linear growth in the number of cube dimensions or abstraction levels results in an exponential increase in the run-time cost for computing the optimal materialization path. However, stream cubes with high dimensionality and several layers of abstraction require significant memory and run-time costs, thereby making them unsuitable for processing data streams. Large stream cubes may be managed by selecting the m-layer and o-layer appropriately.

As described herein above with reference to FIGS. 11-12, after determining the optimal materialization path, the stream cube needs to be refreshed to reflect the changes in the path. This may involve resetting the paths of all sub-cubes in the tilted time frame to a new materialization path (1130).

Figure 17:
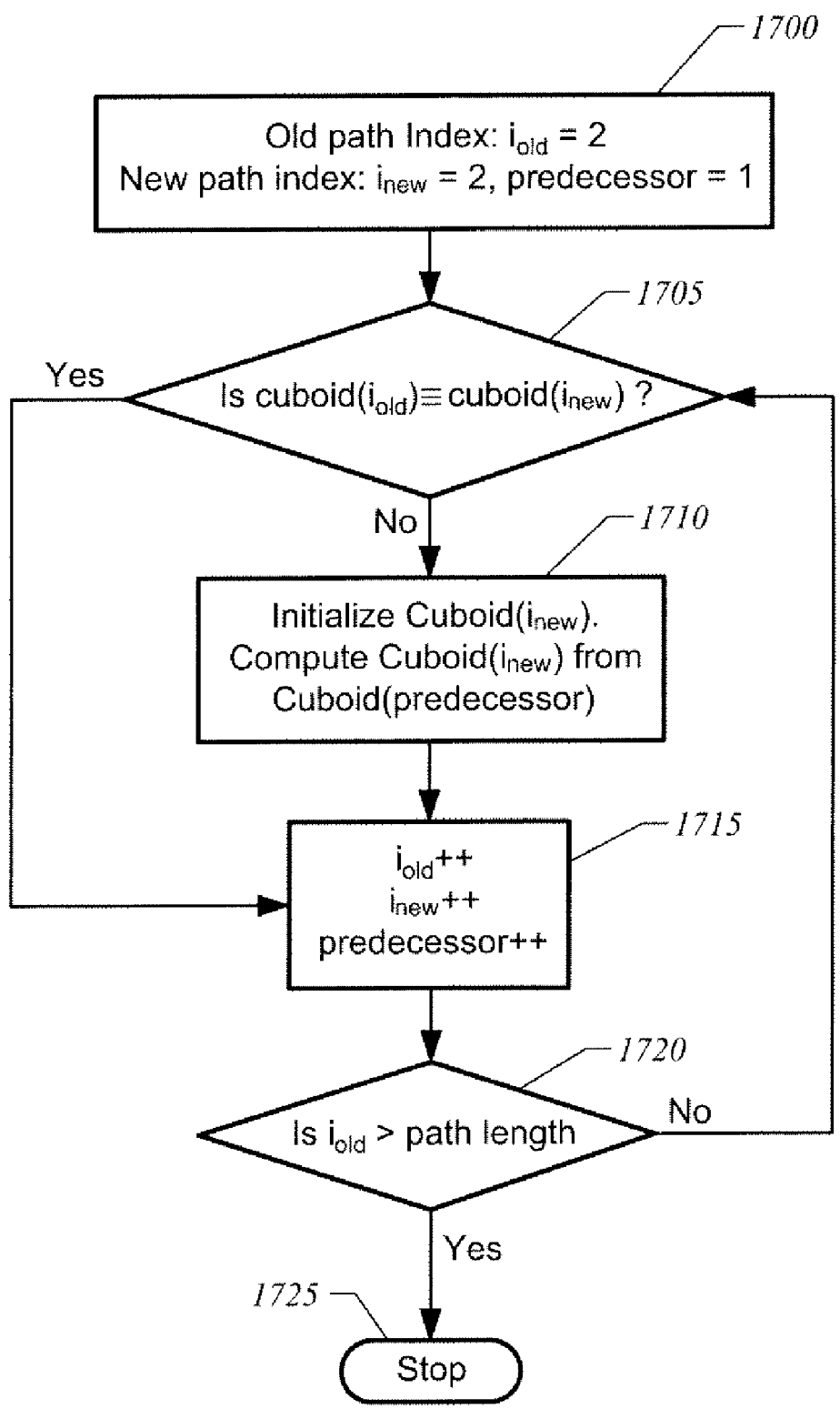
FIG. 17 illustrates a flow chart for resetting a materialization path to a newly computed materialization path in accordance with an embodiment of the invention.

Referring now to FIG. 17, a flow chart for resetting a materialization path to a newly computed materialization path is described. First, the new materialization path is iterated from the m-layer to the o-layer, comparing it to the old materialization path (1705). If at a specific layer, the new path has a different cuboid from the old path, the measures of the old cuboid are cleared and the new cuboid is materialized from measures stored in the preceding cuboid in the new materialization path (1710). This process continues until all cuboids in the new materialization path have been computed and the old cuboids in the old materialization path have been cleared (1715-1725).

The cost of modifying the materialization path of a cube is dependent on the size of cuboids found in the new path that were not materialized in the previous path. Hence, the cost depends on the degree of change from the old path to the new path. As appreciated by one of ordinary skill in the art, cuboid sizes typically decrease from the n-layer to the o-layer. Accordingly, assuming that all cuboids are at most as large as the m-layer cuboid and the new materialization path has a size of m(n−1)+1, then the computational cost of a path modification is $O(mn|C_{1,1}|)$.

Since a materialization path change effects all sub-cubes within a tilted time frame, the cost of a single path change is multiplied by the number of sub-cubes maintained within the tilted time frame. To prevent overloading the system by modifying paths of all the sub-cubes at once, path changes are gradually enforced. As described above with reference to FIGS. 11-12, each leg of the tilted time frame is only modified when its update interval is up and it needs to output results. Therefore, changes do not occur suddenly and grind the system into a halt; instead, they are spread over the period of the tilted time frame. It is appreciated that this strategy enables frequent path changes to only affect legs that have short update intervals.

Advantageously, the present invention enables stream cubes to be dynamically materialized according to system conditions and users' requests. This provides flexibility and power to adapt to changing conditions in contrast with previously-suggested static materializations.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, storing executable instructions to:
   generate a stream cube to store data received from multiple data sources;
   generate a plurality of multi-dimensional data streams to represent the received data;
   repeatedly determine materialization strategies to implement for the stream cube during a duration of the stream cube, wherein at least two different materialization strategies are determined; and
   materialize the stream cube according to determined materialization strategies to record the multi-dimensional data streams.

2. The computer readable storage medium of claim 1, wherein the multi-dimensional data streams comprise a plurality of multi-dimensional data tuples, each data tuple associated with a timestamp.

3. The computer readable storage medium of claim 2, wherein the stream cube comprises a plurality of sub-cubes associated with a plurality of time ranges each sub-cube aggregating multi-dimensional data for a given time range.

4. The computer readable storage medium of claim 3, wherein each sub-cube comprises a plurality of cuboids, each cuboid representing a set of dimensions and measures.

5. The computer readable storage medium of claim 3, wherein the plurality of sub-cubes are grouped by a set of time ranges.

6. The computer readable storage medium of claim 1, wherein the executable instructions to repeatedly determine materialization strategies for the stream cube comprise executable instructions to repeatedly evaluate system conditions and users' requests and determine how to materialize the stream cube in response to the system conditions and users' requests.

7. The computer readable storage medium of claim 6, wherein the materialization strategy comprises a materialization strategy selected from the group consisting of on-demand materialization, full materialization, and partial materialization.

8. The computer readable storage medium of claim 7, wherein the executable instructions to repeatedly determine a materialization strategy for the stream cube comprise executable instructions to repeatedly determine which of at least two materialization paths to implement for the stream cube according to a predetermined criterion and a cost function.

9. The computer readable storage medium of claim 8, wherein the executable instructions to materialize the stream cube comprise executable instructions to record the plurality of multi-dimensional data streams along the materialization path.

10. A non-transitory computer readable storage medium, storing executable instructions to:
    generate a stream cube for representing multi-dimensional data streams;
    repeatedly determine, during a duration of the stream cube, which of a plurality of materialization paths to implement for the stream cube based on a predetermined criterion and a cost function; and
    record the multi-dimensional data streams into the stream cube according to the determined materialization paths.

11. The computer readable storage medium of claim 10, wherein the multi-dimensional data streams comprise a plurality of multi-dimensional data tuples, each data tuple associated with a timestamp.

12. The computer readable storage medium of claim 11, wherein the stream cube comprises a plurality of sub-cubes associated with a plurality of time ranges, each sub-cube aggregating multi-dimensional data for a given time range.

13. The computer readable storage medium of claim 12, wherein each sub-cube comprises a plurality of cuboids, each cuboid representing a set of dimensions and measures.

14. The computer readable storage medium of claim 13, wherein the executable instructions to repeatedly determine materialization paths comprise executable instructions to repeatedly evaluate the predetermined criterion to determine when to compute the determined materialization path.

15. The computer readable storage medium of claim 14, wherein the predetermined criterion is selected from a group consisting of a query-based criterion, a threshold-based criterion, and a time-based criterion.

16. The computer readable storage medium of claim 14, wherein the executable instructions to repeatedly determine materialization paths comprise executable instructions to compute the cost function for each cuboid.

17. The computer readable storage medium of claim 16, wherein the cost function comprises a function of a set of parameters and a set of weights assigned to the cuboid parameters.

18. The computer readable storage medium of claim 17, wherein the cuboid parameters are selected from a group consisting of cuboid materialization memory cost, cuboid popularity, and cuboid update potential.

19. The computer readable storage medium of claim 16, further comprising executable instructions to determine a cost for each potential materialization path in the stream cube.

20. The computer readable storage medium of claim 19, further comprising executable instructions to select the materialization path from all potential materialization paths that has the lowest cost.

21. The computer readable storage medium of claim 20, wherein the executable instructions to select the materialization path comprise executable instructions to use an optimization technique selected from the group consisting of dynamic programming, integer programming and simulated annealing.

22. The computer readable storage medium of claim 13, wherein the executable instructions to record the multi-dimensional data streams into the stream cube according to the materialization path comprise executable instructions to update measures for cuboids along the materialization path within each sub-cube in the plurality of sub-cubes.

23. A method for dynamically materializing a multi-dimensional stream cube having a plurality of cuboids, comprising:
repeatedly computing a cost for materializing each cuboid in the stream cube;
repeatedly computing a cost for each of two or more potential materialization paths in the stream cube; and
repeatedly selecting, during a duration of the stream cube, a materialization path from the potential materialization paths in the stream cube that has the lowest cost;
refreshing the stream cube according to the selected materialization paths.

24. The method of claim 23, further comprising:
iterating through all cuboids in the stream cube from a first cuboid to a second cuboid to determine a predecessor cuboid for each cuboid, the predecessor cuboid associated with a cost value;
storing the predecessor cuboid and its associated cost value; and
backtracking from the second cuboid to the first cuboid to generate a materialization path for the stream cube.

* * * * *

UNITED STATES PATENT AND TRADEMARK OFFICE
CERTIFICATE OF CORRECTION

PATENT NO. : 8,024,287 B2  
APPLICATION NO. : 12/163952  
DATED : September 20, 2011  
INVENTOR(S) : Azza Mohamed N. M. S. A. Abouzeid et al.

Page 1 of 1

It is certified that error appears in the above-identified patent and that said Letters Patent is hereby corrected as shown below:

Title Page, Item (75) Inventors:

** Correction of spelling of inventors last name
from:
    Azza Mohamed Nagib Mohamed Shawkat Abdellatif ~~Abouzied~~
To:
    Azza Mohamed Nagib Mohamed Shawkat Abdellatif <u>Abouzeid</u> **

Signed and Sealed this
Twenty-eighth Day of May, 2013

Teresa Stanek Rea
*Acting Director of the United States Patent and Trademark Office*